US008606554B2

(12) United States Patent
Zimmermann et al.

(10) Patent No.: US 8,606,554 B2
(45) Date of Patent: Dec. 10, 2013

(54) HEAT FLOW MODEL FOR BUILDING FAULT DETECTION AND DIAGNOSIS

(75) Inventors: Gerhard Zimmermann, Kaiserslautern (DE); Yan Lu, West Windsor, NJ (US); George Lo, Plainsboro, NJ (US)

(73) Assignee: Siemens Aktiengesellschaft, Munich (DE)

( * ) Notice: Subject to any disclaimer, the term of this patent is extended or adjusted under 35 U.S.C. 154(b) by 632 days.

(21) Appl. No.: 12/906,186

(22) Filed: Oct. 18, 2010

(65) Prior Publication Data

US 2011/0093424 A1    Apr. 21, 2011

Related U.S. Application Data

(60) Provisional application No. 61/252,862, filed on Oct. 19, 2009.

(51) Int. Cl.
| | | |
|---|---|---|
| G06G 7/56 | (2006.01) | |
| G06G 7/50 | (2006.01) | |
| G01M 1/38 | (2006.01) | |
| G05B 13/00 | (2006.01) | |
| G05B 15/00 | (2006.01) | |
| G05D 23/00 | (2006.01) | |
| G06F 15/177 | (2006.01) | |

(52) U.S. Cl.
USPC ............ 703/5; 703/9; 700/276; 700/277; 715/734

(58) Field of Classification Search
USPC ............ 703/5, 9; 700/276, 277; 715/734
See application file for complete search history.

(56) References Cited

U.S. PATENT DOCUMENTS

| | | | |
|---|---|---|---|
| 5,209,398 A | 5/1993 | Drees | |
| 2004/0057491 A1* | 3/2004 | Stenestam | 374/29 |
| 2006/0010388 A1* | 1/2006 | Imhof et al. | 715/734 |
| 2008/0033674 A1 | 2/2008 | Nikovski et al. | |
| 2008/0082304 A1* | 4/2008 | Miller | 703/9 |
| 2010/0262298 A1* | 10/2010 | Johnson et al. | 700/277 |
| 2011/0077779 A1* | 3/2011 | Fuller et al. | 700/276 |
| 2012/0245968 A1* | 9/2012 | Beaulieu et al. | 705/7.11 |

OTHER PUBLICATIONS

Peng Xu, NPL, "A library of HVAC component models for use in automated diagnostics", Oct. 2006 (Google).*
J. Liang, NPL, "Model based fault detection and Diagnosis of HVAC systems using Support Vector Machine Method", Jan. 2007.*
Srinivas Katipamula, NPL, "Methods for Fault detection, Diagnostics, and Prognostics for building systems", Jan. 2005.*
Jeffrey, Schein, NPL, "A hierarchical rule based fault detection and diagnostic method for HVAC systems", Jan. 2006.*
Gao et al., "Multizone Building with VAV Air-Conditioning System Simulation for Evaluation and Test of Control Systems", Dec. 31, 2007, pp. 348-355, Proceedings: Building Simulation 2007.

(Continued)

*Primary Examiner* — Omar Fernandez Rivas
*Assistant Examiner* — Angel Calle

(57) ABSTRACT

Systems and methods are described that provide a Heat Flow Model (HFM) graph modeling methodology. Embodiments automatically translate formal HVAC system descriptions from a Building Information Model (BIM) into HFM graphs, and compile the graphs into executable FDD systems. During an engineering phase, a user interface is used to enter parameters, conditions, and switches not found in the BIM. During a runtime phase, real-time data from an HVAC control system is input to the generated FDD system (HFM graph) for fault detection and diagnosis.

20 Claims, 17 Drawing Sheets

(56) References Cited

OTHER PUBLICATIONS

Schein et al.,"A Hierarchical Rule-Based Fault Detection and Diagnostic Method for HVAC Systems", HVAC&R Research, vol. 12, No. 1, Jan. 31, 2006, pp. 111-125.

Liang et al., "Model-based Fault Detection and Diagnosis of HVAC Systems Using Support Vector Machine Method", International Journal of Refrigeration, vol. 31. No. 6, Aug. 10, 2007, pp. 1104-1114.
International Search Report dated Feb. 18, 2011.

* cited by examiner

| HFM Node Type | IFC HVAC Element | IFC type |
|---|---|---|
| Duct | ifcDuctSegment | |
| DuctFork | IfcDuctFitting | JUNCTION |
| DuctJoint | IfcDuctFitting | JUNCTION |
| Fan | IfcFan | |
| Damper | IfcDamper | CONTROLDAMPER |
| Heating Coil | IfcCoil | ELECTRICHEATINGCOIL |
| Cooling Coil | IfcCoil | WATERCOOLINGCOIL |
| Pump | IfcPump | |
| Valve | IfcValve | REGULATING |
| Boiler | IfcBoiler | |
| Chiller | IfcChiller | |
| MixingBox | Composite of ifc elements | |
| Reheat Valve | Composite of ifc elements | |
| Sensor | IfcSensor | TEMPERATURESENSOR PRESSURESENSOR HUMIDITYSENSOR |
| Controller | IfcFlowController | |

FIG. 9

HEAT FLOW MODEL FOR BUILDING FAULT DETECTION AND DIAGNOSIS

CROSS REFERENCE TO RELATED APPLICATIONS

This application claims the benefit of U.S. Provisional Application No. 61/252,862, filed on Oct. 19, 2009, the disclosure which is incorporated herein by reference in its entirety.

BACKGROUND OF THE INVENTION

The invention relates generally to process control. More specifically, the invention relates to a Heat Flow Model (HFM) methodology for HVAC system fault detection and diagnosis. Embodiments use the modularity of graphs to achieve a direct automated mapping of HVAC structures and components into HFM graphs, and use node behavior model and software libraries to translate the HFM graphs into systems that can be integrated in HVAC control systems.

Modern Heating, Ventilation and Air Conditioning (HVAC) control systems are often too complex to have proper means for effective Fault Detection and Diagnosis (FDD) and correction. With many existing FDD approaches, the engineering efforts to apply and adapt them to various HVAC systems are great.

Building HVAC mechanical and control systems are prone to many faults that cause failures. Some failures lead to alarms, others decrease energy efficiency, lifetime of the system and user comfort without obvious notifications. Even if failures are detected by a maintenance staff, fault localization is often very difficult because there is no one-to-one correspondence between faults and reported failures.

FDD for HVAC has become an important topic with many contributions from academics and industry. However, one problem still remains when the research results are put into practice, since nearly all buildings are different there is a huge variety of HVAC systems. If the FDD system does not match a particular HVAC system, not enough faults are detected. And if it is customized for a specific system, the development effort and cost may be too high in relation to the possible gain.

The use of expert systems to diagnose faults in HVAC components and systems have been tried and include rule-based methods, fuzzy model based strategies, and Artificial Neural Network (ANN) based classifiers.

Usually a set of failure rules based on temperature or pressure inequalities is derived to detect faults. In most of the studies, either the rules have been derived manually for each specific HVAC system or the ANN has to be trained offline which may not necessarily cover all of the faults due to the limited training data.

These processes are time consuming and labor intensive. As the recent advancement in building modeling technology has already impacted the building design and construction engineering process significantly, it is believed that developing an FDD system based on building information models will both enhance building fault diagnosis capability and reduce the engineering process of generating fault rules.

Multilevel Flow Models (MFM) have been applied to power plants and similar systems. The flow models are graphs representing mass, energy and information flows. Once the graphs are established, rules based on mass and energy conservation laws are extracted and analyzed by an inference engine to realize the FDD in real-time.

The MFM flow models are graphs representing mass, energy and information flows where mass and energy conservation laws apply and can be used for fault detection and diagnosis. However, to use MFM, the flows have to be measured, which are often not available for an HVAC system.

What is desired is a system and method that provides FDD to reduce this effort.

SUMMARY OF THE INVENTION

The inventors have discovered that it would be desirable to have systems and methods that provide a Heat Flow Model (HFM) methodology. Embodiments automatically translate formal HVAC system descriptions from a Building Information Model (BIM) into HFM graphs, and compile the graphs into executable FDD systems. During an engineering phase, a Graphic User Interface (GUI) is used to configure parameters, conditions, and logic switches not found in the BIM. During a runtime phase, real-time data from an HVAC control system is input to the generated FDD system (HFM graph) for fault detection and diagnosis.

Embodiments create a hierarchical HFM graph model which can be used for automatic HVAC FDD generation from appropriate BIMs such as Industrial Foundation Class (IFC). HFM has a one-to-one correspondence with the component structure of existing or planned HVAC systems. HFM nodes such as coils, ducts or fans model the dynamic physical behavior (temperature, flow, humidity and pressure) of air and water flows of these components as precise as can be derived from the BIMs. Each node can calculate its upstream and downstream physical behavior parameter values of connected HVAC components with the dynamic output data from the HVAC control system using instrument sensor and control values. The results are propagated through the HFM graph as parameter ranges.

Embodiments apply failure rules in each HFM node. If calculated estimate and received value ranges do not match, a fault is presumed and its severity is propagated up in the component hierarchy for diagnosis. The diagnosis is performed by a central engine by mapping the rule violations from HFM nodes to the failures of the HVAC system, the mapping relationship is represented by an Associative Network. The HFM based FDD is composed of an engineering tool and runtime system.

Embodiments create an HFM graph based model for building HVAC system FDD. Embodiments automatically extract the necessary structural and quantitative data about the target system from BIM descriptions, e.g. IFC. Rules for detecting faults that are related to nodes of the graph are defined based on first principles.

One aspect of the invention provides a Heat Flow Model (HFM) node used in a Heating, Ventilation and Air Conditioning (HVAC) fault detection graph. Aspects according to the HFM node include a FwdIn edge configured to receive parameter ranges from a downstream direction, a FwdOut edge configured to output parameter ranges in the downstream direction, a RevIn edge configured to receive parameter ranges from an upstream direction, a RevOut edge configured to output parameter ranges in the upstream direction, and node specific configuration data that defines the functionality of the node.

Another aspect of the HFM node is one or more RulesOut edges configured to output a failure rule decision where the node specific data further comprises a failure rule corresponding to each RulesOut edge where, for the downstream direction, a failure rule compares an estimated parameter range with a FwdIn edge parameter range and for the upstream direction, a failure rule compares an estimated parameter range with a RevIn edge parameter range, and if the estimated parameter range is not within the received parameter ranges, a failure is output.

Another aspect of the HFM node is the node specific configuration data further comprises FwdIn edge parameter range tolerances and RevIn edge parameter range tolerances.

Another aspect of the HFM node is for the downstream direction, an estimated parameter range is a product of a RevIn edge parameter range and a RevIn edge parameter range tolerance, and for the upstream direction, an estimated parameter range is a product of a FwdIn edge parameter range and a FwdIn edge parameter range tolerance.

Another aspect of the HFM node is one or more DataIn edges, each configured to receive a dynamic HVAC control system variable, and the node specific configuration data further comprises DataIn edge dynamic HVAC control system variable parameter tolerance values.

Another aspect of the HFM node is for the downstream and upstream directions, an estimated parameter range is a product of a DataIn edge dynamic HVAC control system variable and its dynamic HVAC control system variable parameter tolerance value.

Another aspect of the invention is a method of using a Heat Flow Model (HFM) graph for detecting HVAC system faults for a building. Aspects according to the method include translating formal HVAC system descriptions from a Building Information Model (BIM) for the building as HFM nodes, retrieving HVAC component attributes from the BIM for each HFM node, retrieving predefined HFM nodes from an HFM node library, creating connectivity among different HFM nodes from BIM connectivity data, compiling the HFM nodes into an HFM graph, inputting real-time data from the building HVAC control system to the HFM graph for fault detection, detecting building HVAC system faults using rules defined based on first principles that are related to the HFM nodes, and mapping rule violations from the HFM nodes to the building HVAC control system failures.

Another aspect of the method is where each node in the HFM graph estimates upstream and downstream physical behavior values that correspond to their building HVAC components with dynamic output instrument sensor and control data from the building HVAC control system and propagates the upstream and downstream physical behavior values through the HFM graph as parameter ranges.

Another aspect of the invention is a building Heating, Ventilation and Air Conditioning (HVAC) fault detection system. Aspects according to the method include an interface configured to access a Building Information Model (BIM) file library and import the building HVAC system BIM files, an HFM node library configured to store a plurality of different predefined HFM node types where an HFM node models the dynamic physical behavior parameters of air and water flows in predefined HVAC components as derived from the BIM files, a Graphic User Interface (GUI) configured to input and edit HFM node and linkage configuration data during an HFM graph assembly, a compiler coupled to the interface and GUI, configured to compose together the BIM file data with the additional configuration data, and a Fault Detection and Diagnosis (FDD) generator coupled to the compiler and HFM node library, configured to compare the BIM file types for the building HVAC system with the predefined HFM node types and select HFM nodes that correspond and generate an HFM graph where the HFM graph is by mass air flow path corresponding to the building HVAC system components and behavior.

Another aspect of the system is an FDD engine configured to instantiate the HFM graph as a runtime system for the building HVAC control system, and an interface configured to access the building HVAC control system, where the FDD engine executes the HFM graph with HVAC control system process and control variable data and applies rules for detecting HVAC system faults.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIG. 9 is an exemplary table showing Industrial Foundation Class (IFC) types corresponding with HFM nodes.

DETAILED DESCRIPTION

Figure 1:
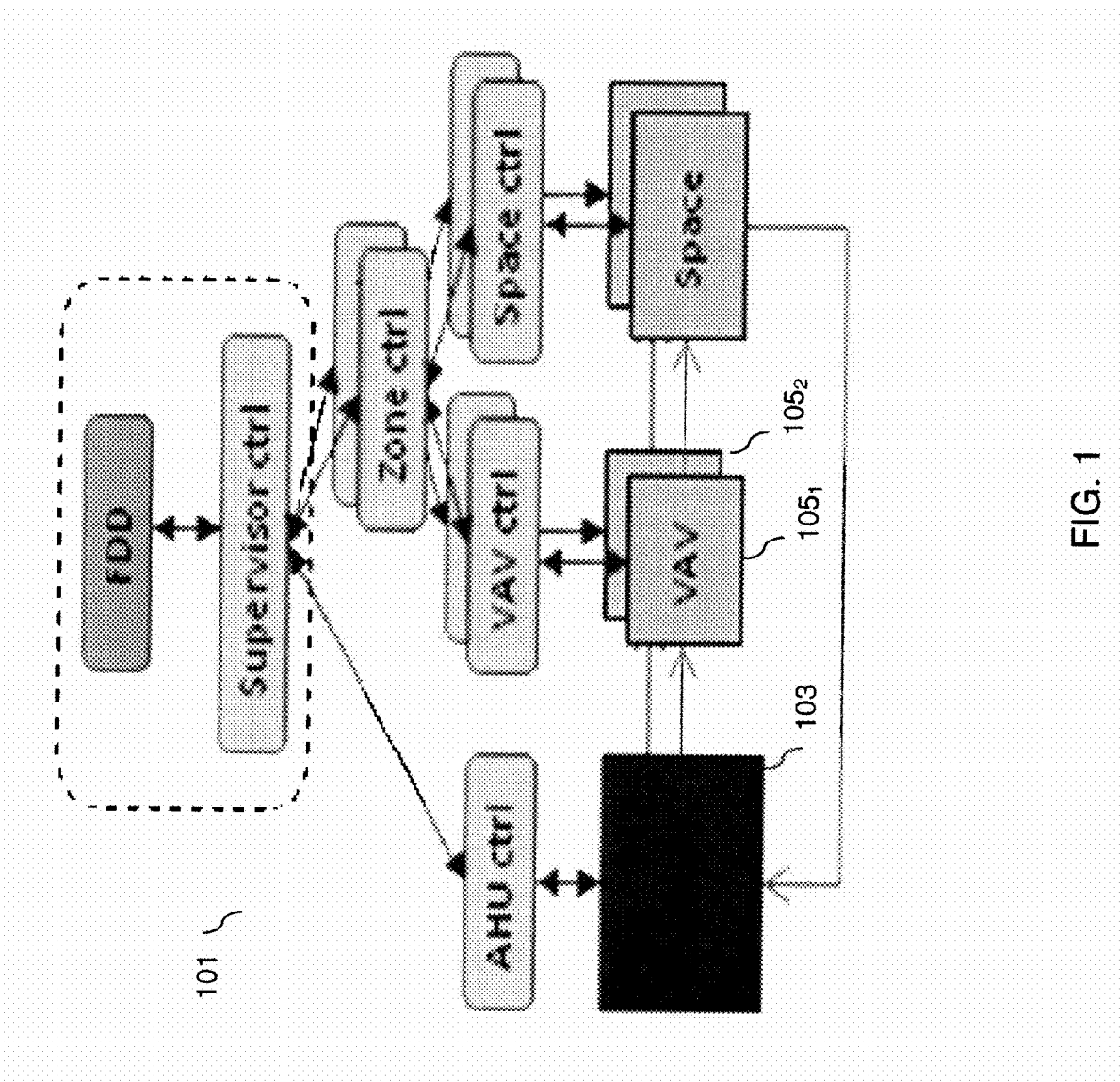
FIG. 1 is an exemplary HVAC Fault Detection and Diagnosis (FDD) integration.

Embodiments of the invention will be described with reference to the accompanying drawing figures wherein like numbers represent like elements throughout. Before embodiments of the invention are explained in detail, it is to be understood that the invention is not limited in its application to the details of the examples set forth in the following description or illustrated in the figures. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having," and variations thereof herein is meant to encompass the items listed thereafter and equivalents thereof as well as additional items.

The terms "connected" and "coupled" are used broadly and encompass both direct and indirect connecting, and coupling. Further, "connected" and "coupled" are not restricted to physical or mechanical connections or couplings.

It should be noted that the invention is not limited to any particular software language described or that is implied in the figures. One of ordinary skill in the art will understand that a variety of software languages may be used for implementation of the invention. It should also be understood that some of the components and items are illustrated and described as if they were hardware elements, as is common practice within the art. However, one of ordinary skill in the art, and based on a reading of this detailed description, would understand that, in at least one embodiment, components in the method and system may be implemented in software or hardware.

Embodiments of the invention provide methods, system frameworks, and a computer-usable medium storing computer-readable instructions that translate formal HVAC system descriptions from a BIM into a Heat Flow Model (HFM) graph for HVAC FDD having a one-to-one correspondence with the component structure of a building HVAC system, which are compiled into an executable FDD system. Real-time data from the building HVAC control system is input to the FDD system for fault detection and diagnosis. The invention may be deployed as software as an application program tangibly embodied on a program storage device. The application code for execution can reside on a plurality of different types of computer readable media known to those skilled in the art.

An HFM is a graph comprised of HFM nodes that correspond to real HVAC system components. The HFM nodes correspond to mass flow connections such as ducts or pipes or electrical energy. The HFM nodes simulate real HVAC components' dynamic functionality (behavior) as precise as the provided BIM parameters and the dynamic control system data allow for. An HFM graph can be generalized as a component hierarchy. This allows for different levels of refinement and abstraction.

A BIM is a digital representation of physical and functional characteristics of a facility and serves as a shared knowledge resource for information about a facility. One BIM is the Industry Foundation Classes (IFC). The IFC modeling language is powerful and can be extended to describe every detail of an HVAC system. However, there is no unique way to model a specific system. Embodiments use IFC models of existing or planned buildings to create FDD systems automatically.

IFC is one of the most commonly used formats for interoperability. The IFC model provides a standard representation of the underlying objects, their properties and relationships including HVAC, electrical, plumbing, fire protection, building control, etc.

An HFM based FDD system can be integrated into an existing HVAC supervisory control system structure of a building. The FDD system can communicate directly with top level control. However, an HFM graph representation permits a large degree of modularity of the FDD system and integration at any level of the system as a distributed system.

FIG. 1 shows an exemplary HVAC control system 101. The system 101 comprises one zone with one single duct Air Handling Unit (AHU) 103 to supply hot or cold air for two reheat Variable Air Volume (VAV) systems $105_1$, $105_2$ (105 collectively). Each VAV 105 distributes hot or cold air to a space via outlets with thermostatic feedback control. Return air is collected and returned to the AHU 103.

Figure 2:
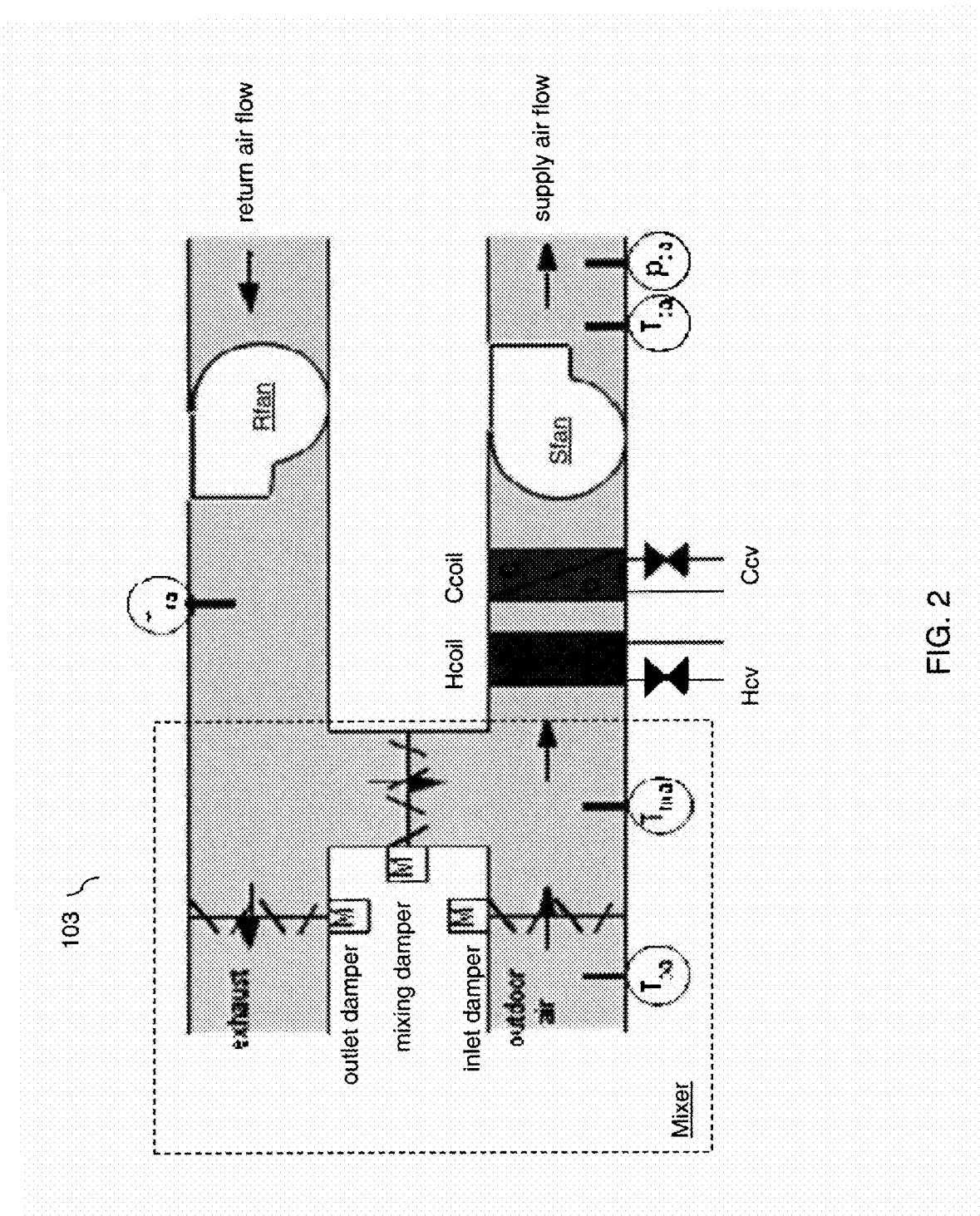
FIG. 2 is an exemplary Air Handling Unit (AHU) duct and instrumentation diagram.

FIG. 2 shows the structure and control of the AHU 103. The AHU 103 comprises a return air fan Rfan, a supply air fan Sfan, a mixing box Mixer, a heating coil Hcoil with modulating control valve Hcv, a cooling coil Ccoil with modulating control valve Ccv, four temperature sensors Tra, Toa, Tma, Tsa and one pressure sensor Psa. The supply fan Stan may be pressure controlled. The return fan Rfan is controlled by the return pressure to keep air flows balanced. The pressure controlled fan may include a differential pressure sensor to measure the air flow, which is monitored by an AHU controller (not shown). A VAV 105 typically comprises a damper to control the air flow into a space, a heating coil, a distribution temperature sensor, and an air flow rate sensor (not shown).

An HFM comprises two types of data: 1) mass that comprises air and water, and 2) electric energy, and is represented by a graph with nodes having parallel directed and anti-parallel directed edges. The HFM nodes model HVAC components and each node's edges input or output state variable and information flows.

Figure 3:
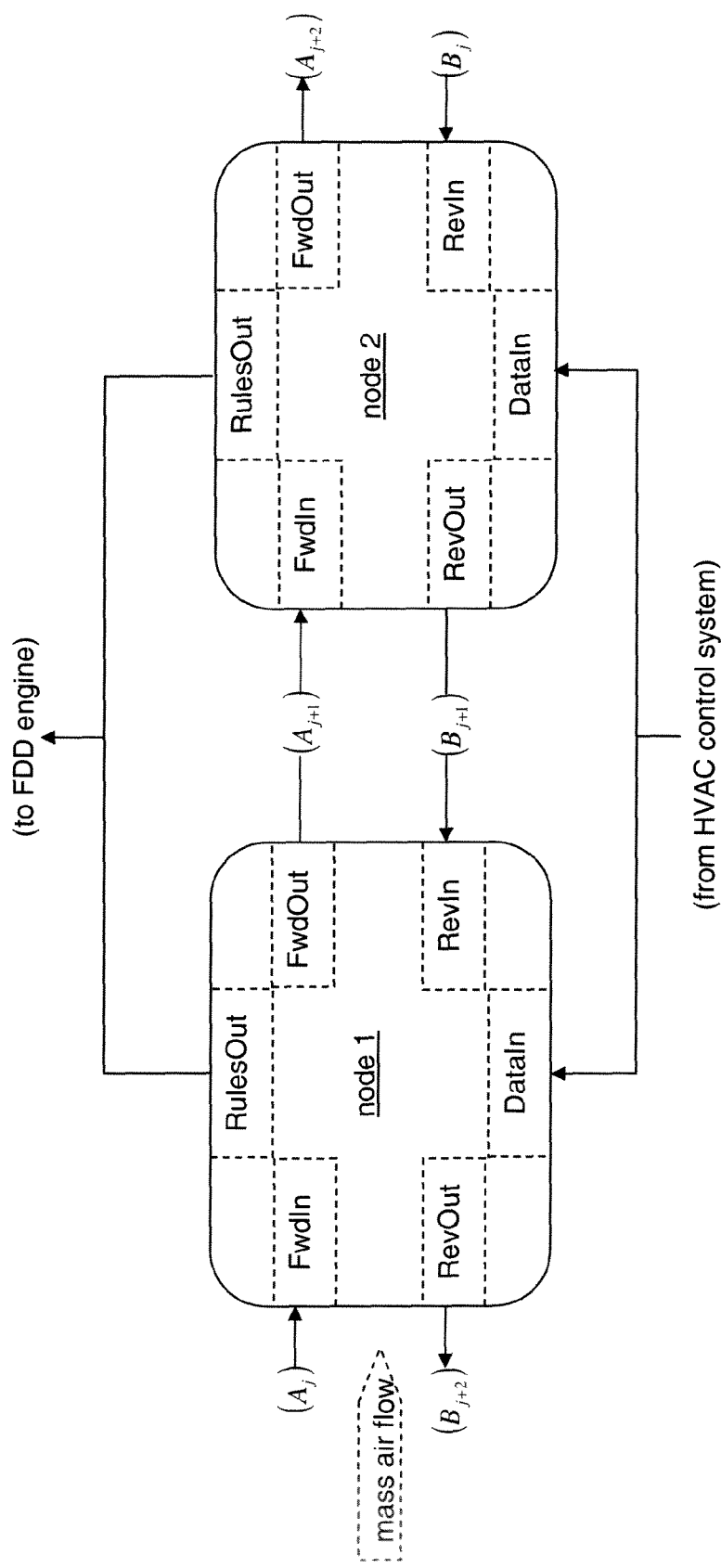
FIG. 3 is an exemplary Heat Flow Model (HFM) graph.

FIG. 3 shows the parallel and non-parallel edge interconnections of HFM nodes 1 and 2. Parallel FwdIn edge inputs physical parameter data to the node from a downstream direction and FwdOut edge outputs physical parameter data that may be the same or different in the downstream direction of mass flow. RevIn edge inputs physical parameter data to the node from an upstream direction and RevOut edge outputs physical parameter data that may be the same or different in the upstream direction. For example, a heating coil node can have separate FwdIn/FwdOut edges and RevIn/RevOut edges for air and heating water physical data interconnections if the air and water are modeled.

The number of anti-parallel DataIn edges and RulesOut edges vary depending on the number of mass or energy flows that are considered in a node. DataIn edges each input a dynamic HVAC control system sensor (process variable) and control (control variable) data. RulesOut edges each output an HFM node specific failure rule value to an FDD engine.

For each HFM node, the real physical data is represented as a vector. For FDD, air flow data parameters of interest are temperature, mass flow rate, humidity and pressure.

In order to generalize HFM node interconnections, a vector with four air flow data parameter ranges is propagated between HFM nodes in downstream $A_j$ and upstream $B_j$ directions, $$A_j = \begin{bmatrix} Tmax \\ Tmin \\ Qmax \\ Qmin \\ Hmax \\ Hmin \\ pmax \\ pmin \end{bmatrix}, \text{ and} \quad (1)$$

$$B_j = \begin{bmatrix} Tmax \\ Tmin \\ Qmax \\ Qmin \\ Hmax \\ Hmin \\ pmax \\ pmin \end{bmatrix}. \quad (2)$$

Each downstream $A_j$ and upstream $B_j$ vector comprise parameter ranges 1) Tmin, Tmax which are the minimum and maximum dry bulb air temperatures, 2) Qmin, Qmax which are the minimum and maximum mass air flow rates 3) Hmin, Hmax which are the minimum and maximum water vapor pressures, and 4) pmin, pmax which are the minimum and maximum air pressures.

Heating or cooling water vector state variable data comprises temperature, flow and pressure values.

Figure 4:
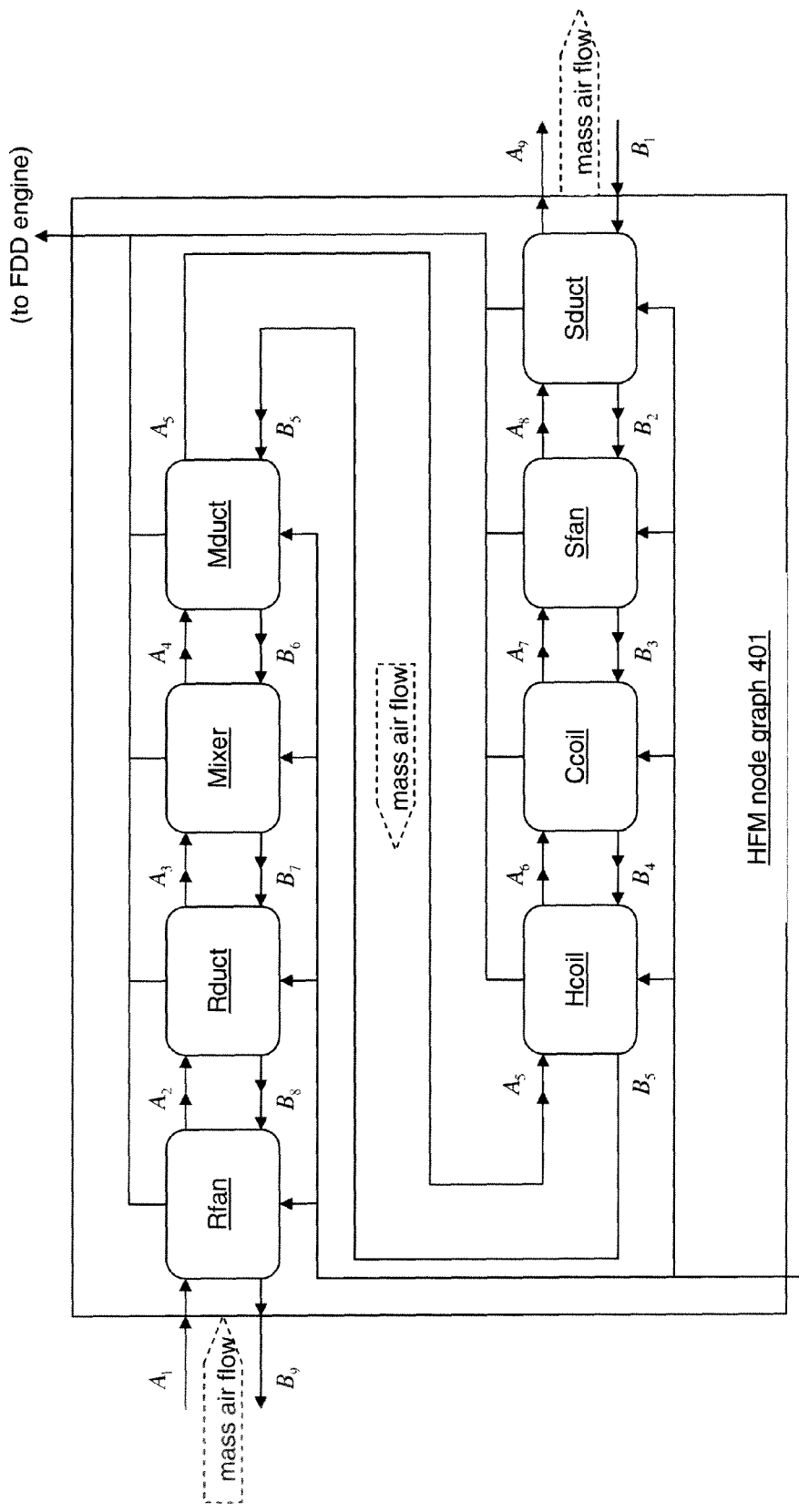
FIG. 4 is an exemplary HFM graph for the AHU shown in FIG. 2.

FIG. 4 shows an HFM node graph 401 for AHU 103 comprising eight HFM nodes that include five HFM node types: two fan nodes (Rfan, Sfan), two sensor duct nodes (Rduct, Mduct), one mixer node (Mixer), two coil nodes (Hcoil, Ccoil) and one two sensor duct node (Sduct). The HFM graph 401 is shown without anti-parallel DataIn/RulesOut edges.

The downstream flow begins with the return supply fan Rfan node. Rfan is coupled to a duct segment Rduct node which includes a DataIn edge for temperature sensor Tra data. Rduct is coupled to a mixing box Mixer node which includes a DataIn edge for outdoor temperature sensor Toa data. Mixer is coupled to a duct segment Mduct node which includes a DataIn edge for mixing temperature sensor Tma data. Mduct is coupled to two successive coil Hcoil and Ccoil nodes for heating and cooling. Ccoil is coupled to a duct segment Sduct node which includes a DataIn edge for temperature sensor Tsa data for indicating the AHU's output temperature and a DataIn edge for pressure sensor Psa data for indicating the AHU's output pressure.

AHU 103 can be modeled as one HFM node at a higher level of the hierarchy with inputs for air and water, if the heated water supply system is modeled.

Each HFM node performs two functions: 1) a calculation of downstream FwdOut edge vector $A_{j+1}$ and upstream RevOut edge vector $B_{j+1}$ state variables that it outputs to adjacent nodes based upon estimates derived from HVAC control system data (DataIn) and the node configuration, and 2) a calculation of one or more failure rules (RulesOut) as applied to the downstream FwdIn edge vector $A_j$ and upstream RevIn edge vector $B_j$ state variable parameter ranges based upon estimate parameter ranges derived from control system data (DataIn) and the node configuration.

Each HFM node receives a downstream vector $A_j$ and an upstream vector $B_j$. Depending on a particular node's functionality (behavior), one or more downstream vector $A_j$ and/or one or more upstream vector $B_j$ state variables may change. State variables that change are reflected in the downstream $A_{j+1}$ and upstream $B_{j+1}$ vector state variables output by that node. The downstream $A_{j+1}$ and upstream $B_{j+1}$ vector state variables are propagated to adjacent HFM nodes (FIG. 4).

Each HFM node performs an estimation calculation. Estimations are different from building performance simulators since they lack detailed information about the components of the supervised system, the behavior of the control system and precise sensor data. Because of the lack of detailed information, an HFM node cannot perform full dynamic calculations. However, since HVAC control systems react slowly to environmental perturbations, steady state behavior is considered.

What is not neglected are frequent rule activations due to oscillations in the control system or because too many control actions can reduce the lifetime of the components. It is the task of fault diagnosis to distinguish between different types of short term rule activations.

Node rule estimations are based on the downstream $A_j$ and upstream $B_j$ vector state variables, the affect the node has on one or more of the vector state variables, and sensor/control data input from the HVAC control system during runtime.

For the following example, only downstream vector $A_j$ temperature parameter range Tmin and Tmax are considered. Node Hcoil receives vector $A_5$ having a temperature measured two HFM nodes upstream in Mixer by temperature sensor Tma. Hcoil receives HVAC control system (DataIn) data that modulates its heating coil inlet control valve Hcv. The maximum heating power from the BIM is stored as an Hcoil node specific configuration parameter.

FIG. 2 shows the problem of estimation in that there are many uncertainties, beginning with the tolerance of the air temperature sensor Tma and the unknown air temperature distribution across the duct in which the sensor is mounted. The heated water temperature is not known nor is the heating water flow rate. It may be assumed that the maximum heating power can be reached if the heating water inlet valve is 100% open and water pressure and temperature are at the maximum design values. Therefore, the Hcoil node air output temperature can best be estimated when the valve is closed, or a large range of possible values must be assumed.

For this reason, each node receives a downstream vector $A_j$ and an upstream vector $B_j$. Each upstream and downstream vector parameter is expressed as a minimum and a maximum of an estimated parameter range. If a normal, Gaussian distribution is used for the probability density function of expected values to be in the range, a mean value±standard deviation is used as range limits. In most cases, the shape of the distribution is not known and assumed range limits define the range.

The first step to derive a node's failure rule(s) are to list possible and probable faults. For example, temperature and pressure sensors outputs may drift or fail at one value. Valves and dampers may leak or fail in their last position. Filters and pipes may clog. Process controllers may malfunction. Design faults are also possible. For example, the cooling coil may be undersized and not compensate for an expected heat load.

Any of these faults can cause several failures that can be detected internally or externally. External failures can be directly measured or felt by occupants. For example, a space temperature deviating from a controller setpoint. Internal failures refer to situations where the control system compensates for a fault. For example, a leaking heating coil valve is compensated for by the control system increasing cooling. The user is not affected, but energy consumption is increased. The detection of internal failures is also important because of failure propagation. The closer to the fault a failure is detected, the easier it is to locate.

A failure rule is a conditioned inequality, $$\text{rule} = (\text{condition}: expr1 < expr2 - \text{threshold}), \qquad (3)$$

where expr1 is a vector state variable parameter range minimum, expr2 is a parameter range estimate maximum and threshold is a tolerance. If a rule output is true, a fault exists. Conditions are premises of control values.

AHU 201 has mixed air temperature Tma and supply air temperature Tsa control system sensor measurements. Node Hcoil includes a modulating control valve Hcv and has a DataIn edge control input $u_{hc}$. Node Ccoil includes a modulating control valve Ccv and has a DataIn edge control input $u_{cc}$. The building HVAC control system outputs a control variable in a range of 0 to 1 to modulate control valves.

$$\text{rule1} = (u_{hc} = 0 \text{ and } u_{cc} = 0 : Tsa < Tma - \epsilon_1) \qquad (4)$$

Rule1 states that if neither heating nor cooling is provided ($u_{hc}=0$ and $u_{cc}=0$), the supply temperature Tsa should not be less than mixed air temperature Tma, with the combination of a mixed air temperature Tma sensor tolerance and the supply fan Sfan heat load expressed as threshold $\epsilon_1$. If rule1 is true, the cooling coil valve Ccv may be leaking and/or temperature sensors Tma and/or Tsa may have experienced a fault. If the heating coil valve Hcv is leaking, rule1 would be true. The example shows that several faults can trigger the same rule. The opposite also holds: one fault can trigger several rules.

The above downstream direction temperature rule example shows that besides the control system inputs $u_{hc}$ and $u_{cc}$ for modulating control valves Hcv and Ccv, Tma and Tsa sensor values are required from nodes Mduct and Sduct. Nodes Mduct and Sduct are separated by nodes Hcoil, Ccoil and Sfan. For modularity rule1 (4) has to be evaluated in one of the five nodes. None of the five node types has both Tma and Tsa temperature sensor values.

The solution to needing both Tma and Tsa temperature sensor values is downstream and upstream propagation of sensor data via the downstream $A_j$ and upstream $B_j$ vector state variable parameter ranges.

Instead of a direct propagation, which results in several values propagated in parallel, data are transformed by the nodes according to their physical behavior.

For example, node Hcoil receives temperature measurement Tma from upstream node Mduct. Node Hcoil increases Tma according to the control variable $u_{hc}$ and creates a heating coil temperature Thc. Node Hcoil propagates Thc downstream to node Ccoil. Node Ccoil receives temperature Thc and decreases Thc according to the control variable $u_{cc}$ and creates a cooling coil temperature Tcc. Node Ccoil propagates Tcc downstream to node Sfan. Node Sfan receives temperature Tcc and increases Tcc by a predetermined amount due to fan motor heat load and creates a supply fan temperature Tsf. Node Sfan propagates Tsf downstream to node Sduct. Node Sduct receives temperature Tsf and applies rule1 in a modified form using only local variables as $$\text{rule1} = (u_{hc} = 0 \text{ and } u_{cc} = 0 : Tsa < Tsf - \epsilon_2). \tag{5}$$

The threshold $\epsilon_2$ has changed because the heat load of node Sfan is considered in temperature Tsf. In principle, rule1 (5) can be generalized because the inequality signals a fault for any combination of the control variables $u_{hc}$ and $u_{cc}$. This results in $$\text{rule2} = (Tsa < Tsf - \epsilon_2) \tag{6}$$

Because propagation works upstream as well, rules equivalent to (5) and (6) can be evaluated in each of the five involved nodes. A failure decision depends on several general principles.

One principle is a rule should be applied in the node where a fault may trigger it. Since this relation is not one-to-one, the same rule can be evaluated in several nodes. For rule1 (5), the applicable nodes would be nodes Mduct, Ccoil and Sduct because a fault in either one would trigger the same rule in all three nodes. This redundancy has to be solved by the FDD which is executed in a node at the top of the hierarchy. The advantage of this concept is that nodes can be easily typed and reused for implementations.

Another principle is to evaluate a rule in the node in the flow that provides the most precise state variable value, typically a sensor value. In the example, this is node Sduct that receives temperature sensor data Tsa.

The problem of vector state variable parameter values is inherent tolerance. For example, in (4), the tolerance is observed by threshold $\epsilon_1$. The value of threshold $\epsilon_1$ depends on the affect of several nodes. This decreases the modularity and reusability of node models.

To overcome these problems, embodiments calculate downstream vector $A_j$ and upstream vector $B_j$ state variable parameter ranges within each node, and propagate the calculated downstream vector $A_{j+1}$ and upstream vector $B_{j+1}$ state variable parameter ranges to an adjacent node. A node rule tolerance is a function of control system DataIn edge values received during runtime and state variable configuration parameters for the node obtained from design data of the supervised system. The tolerance is also the result of estimation uncertainties.

For example, the temperature sensor Tma value from node Mduct may have a tolerance of $\pm 0.5°$ C. During runtime, $21°$ C. is measured and input (DataIn) to Mduct. Node Mduct propagates the vector $A_4$ state variable temperature range Tmin, Tmax as $$Tma = 21.0° \text{ C.} \pm 0.5°, \tag{7}$$

$$Mduct\ FwdOut = A_5 = \begin{bmatrix} Tmax21.5 \\ Tmin20.5 \\ Qmax(\ ) \\ Qmin(\ ) \\ Hmax(\ ) \\ Hmin(\ ) \\ pmax(\ ) \\ pmin(\ ) \end{bmatrix}, \tag{8}$$

to node Hcoil and propagates the vector $B_5$ state variable temperature range Tmin, Tmax as $$Mduct\ RevOut = B_6 = \begin{bmatrix} Tmax21.5 \\ Tmin20.5 \\ Qmax(\ ) \\ Qmin(\ ) \\ Hmax(\ ) \\ Hmin(\ ) \\ pmax(\ ) \\ pmin(\ ) \end{bmatrix}, \tag{9}$$

to node Mixer.

Node Hcoil has configured, predefined values for the maximum air temperature increase at maximum mass air flow rate and maximum heating water temperature, each parameter having a tolerance. Because the mass air flow rate has not been measured by the HVAC control system, it may be assumed that the maximum air temperature increase TincrMax=$20.0°$ C. is independent of the air flow rate. During runtime, node Hcoil control valve Hcv may receive a control variable $u_{hc}=0.5$ (DataIn). If the heating coil air temperature increase is proportional to the heating water flow rate, the control variable indicates a heating water flow between 40% and 60% considering nonlinearity of the valve. Therefore, node Hcoil's maximum air temperature increase TincrMax estimate is $$ThcMax = TmaMax + 0.6(TincrMax) \tag{10}$$

$$ThcMax = 21.5° \pm 12.0° \tag{11}$$

$$ThcMax = 33.5°. \tag{12}$$

Using (10), node Hcoil's minimum air temperature increase ThcMin estimate is calculated as $28.5°$ C. This is a local calculation in one node without knowledge about other nodes. Node Hcoil propagates the vector $A_6$ state variable temperature range Tmin, Tmax as $$Hcoil\ FwdOut = A_6 = \begin{bmatrix} Tmax33.5 \\ Tmin28.5 \\ Qmax(\ ) \\ Qmin(\ ) \\ Hmax(\ ) \\ Hmin(\ ) \\ pmax(\ ) \\ pmin(\ ) \end{bmatrix}. \tag{13}$$

Figure 5:
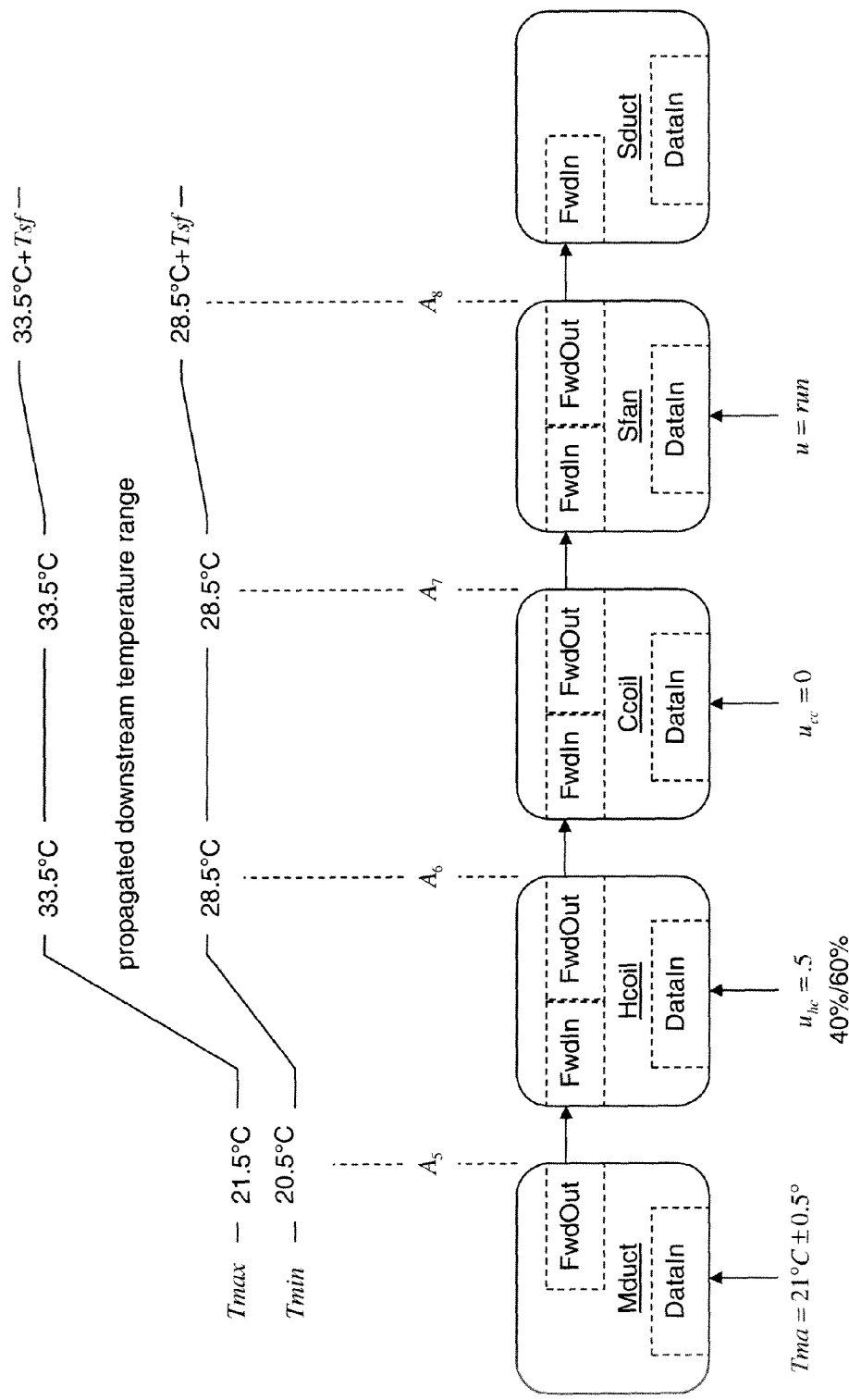
FIG. 5 is an exemplary downstream temperature range propagation for the AHU HFM graph shown in FIG. 4.

FIG. 5 shows the downstream propagation of the air temperature range Tmin,Tmax starting at node Mduct and passing through Hcoil, Ccoil and Sfan and ending at Sduct.

The resulting large tolerances make the state variables useless. This allows the use of the more general rule2 (6) instead of rule1 (5). For the case of heating valve Hcv closed $u_{hc}=0$, the tolerance shrinks to that of temperature sensor Tma and if the cooling valve Ccv is closed $u_{cc}=0$, (6) includes the case (4).

Using the vector state variable parameter range representation, failure rules may be generalized. This is an important contribution to node reusability. For example, node Sduct receives vector $A_8$ having a temperature range Tmin,Tmax and a DataIn edge temperature sensor value Tsa which is transformed into a temperature tolerance range.

As a first approximation it can be assumed that no fault can be deduced if the vector state variable temperature range and Tsa temperature tolerance range overlap, because there is a probability that the real air temperature is within the union of both ranges. A fault is presumed if the vector state variable temperature range and Tsa temperature tolerance range do not overlap.

Figure 6:
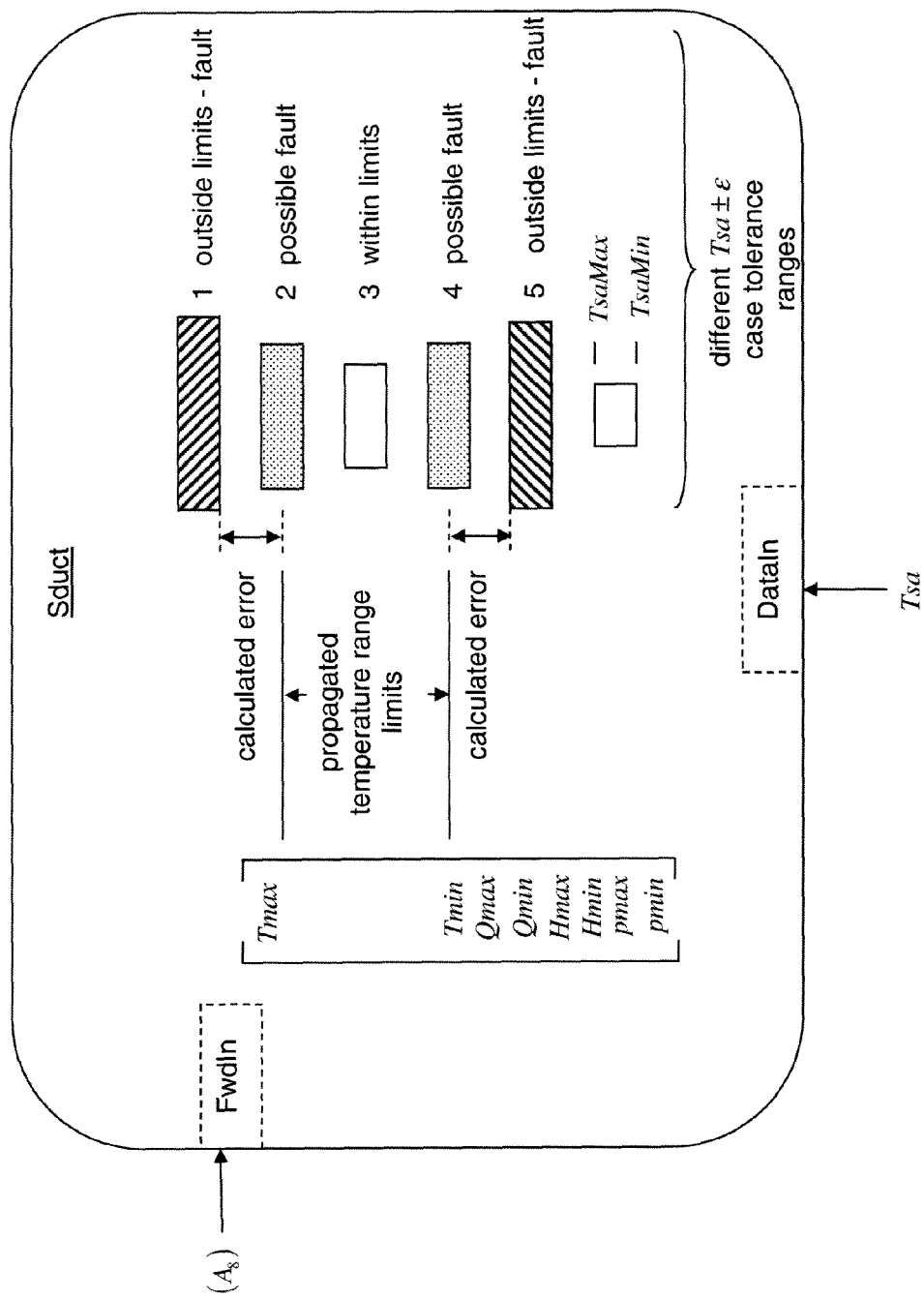
FIG. 6 is an exemplary failure rule situation showing five different calculated estimate tolerance ranges.

FIG. 6 shows five situations for node Sduct receiving vector $A_8$ having a temperature range Tmin,Tmax and comparing it to five different calculated estimate temperature ranges for temperature sensor Ma. Cases 1 and 5 are for two different failure rule activations, case 3 is within limits and therefore no fault, and cases 2 and 4 have a probability of representing a fault.

As a refinement, a continuous failure value can be calculated in addition to the result being true or false. In its simplest form the gap between a parameter range, and its corresponding calculated estimate parameter range can be taken as a measure of the size of the failure if true. FIG. 6 shows two error calculations shown as double arrows for cases 1 and 5. The reason is if a rule evaluates to true, there is still a probability that no failure has occurred because the tolerance range or a threshold may have been chosen too small. The larger the rule value, the lower the probability will be, or expressed differently, the higher the probability of a failure. Therefore, this rule value can be used for failure analysis in addition to the values true and false.

The following equations represent the solution for the above example.

$$\text{rule3}=\max(0, Tsa\text{Min}-\text{FwdIn}T\text{max}) \text{ and} \qquad (14)$$

$$\text{rule4}=\max(0, \text{FwdIn}T\text{min}-Tsa\text{Max}), \qquad (15)$$

where TsaMin is an estimated range minimum and TsaMax is an estimated range maximum. As long as an overlap exists, rule3 and rule4 are zero. For case 1, rule3>0. For case 5, rule4≤0. Cases 1 and 5 indicate failures.

A more general solution is the relation between two temperatures ranges T1 and T2, $$\text{rule1}=\max(0, T_2\text{Min}-T_1\text{Max}), \text{ and} \qquad (16)$$

$$\text{rule2}=\max(0, T_1\text{Min}-T_2\text{Max}). \qquad (17)$$

An extension to (16) and (17) would be normalization. (16) and (17) can also be applied to another temperature range pair $\overline{\text{TsaSens}}$ and $\overline{\text{TsaSet}}$ to check if the temperature control is working properly. Temperature is used an example. Any state variable parameter can be used as rules for failure checking.

The above shows that nodes of the HFM graph can perform estimation and rule evaluation without knowing anything about the rest of the graph besides knowing its neighboring nodes for the communication of flow vectors. This is a case for object orientation with information hiding. For the purpose of generating distributed systems, multi-agent technologies can also be applied without problems.

Not all problems can be solved locally in the nodes at the granularity level that has been shown. This generally is not a problem since a graph is hierarchical and composed nodes are possible as AHU 401 in FIG. 4. AHU 401 is a composed HFM node.

There are also nodes which are not part of the flow such as a controller node. Controllers evaluate different rule types. For example, if a heating and cooling coil control valve control variables are greater than zero at the same time, one or both controllers have sustained a fault.

The advantage of object orientation is the use of types and the derivation of subtypes by inheritance. One type can also produce many instances at runtime. For the purpose of automatic generation of an executable FDD system from a BIM, a library of HFM node types has to be provided. The goal should be to keep this library small to reduce software design and maintenance cost.

AHU 401 shows five different node types. The node examples are single air flow input and output nodes. The Mixer node does not model the flow interfaces to the outdoor environment. The Hcoil and Ccoil nodes do not model their associated heating and cooling water flows. Such simplifications are appropriate if nothing is known about omitted parts. However, modeling the total system improves estimation and rule evaluation.

FIG. 1 shows that the AHU 103 serves several VAV 105 zones. This requires Branch nodes with one air flow input and several outputs and Joint nodes with several air flow inputs and one output. The VAVs 105 are modeled as complex nodes with several components encapsulated. The number of VAV types remains small enough for a node library.

Figure 7A:
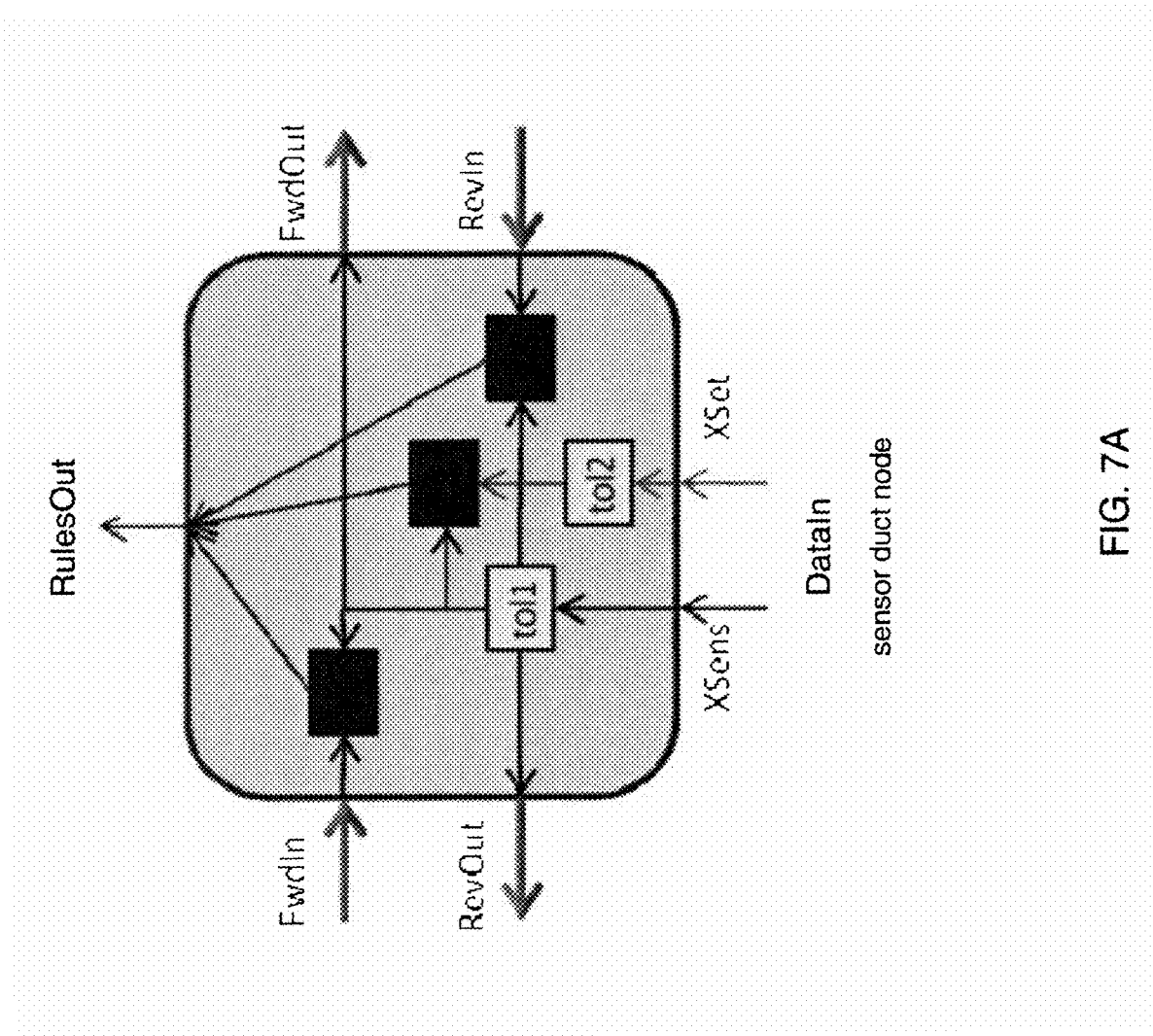
FIG. 7A is an exemplary HFM sensor duct node.

FIG. 7A shows a sensor duct node that includes DataIn edges Xsens and XSet. XSet is a controller setpoint and Xsens is a sensor variable. Xsens is externally controlled to be within a range of XSet. Rule3 (14) tests if this is the case. Estimators tol1 and tol2 transform runtime DataIn XSens and XSet inputs into XSens and XSet tolerance configuration ranges. Rule1 (16), rule2 (17) and rule3 (14) apply.

The sensor duct node is general and can be applied to temperature, flow, humidity and pressure sensor situations. One or more sensors can be modeled in the same duct, representing controlled or uncontrolled variables. The same node type can also be modified for water flow nodes. FIG. 7A does not show flow connections from the inputs directly to the outputs for the variables that are not sensed. These variables do no change in short duct sections and are directly propagated.

Figure 7B:
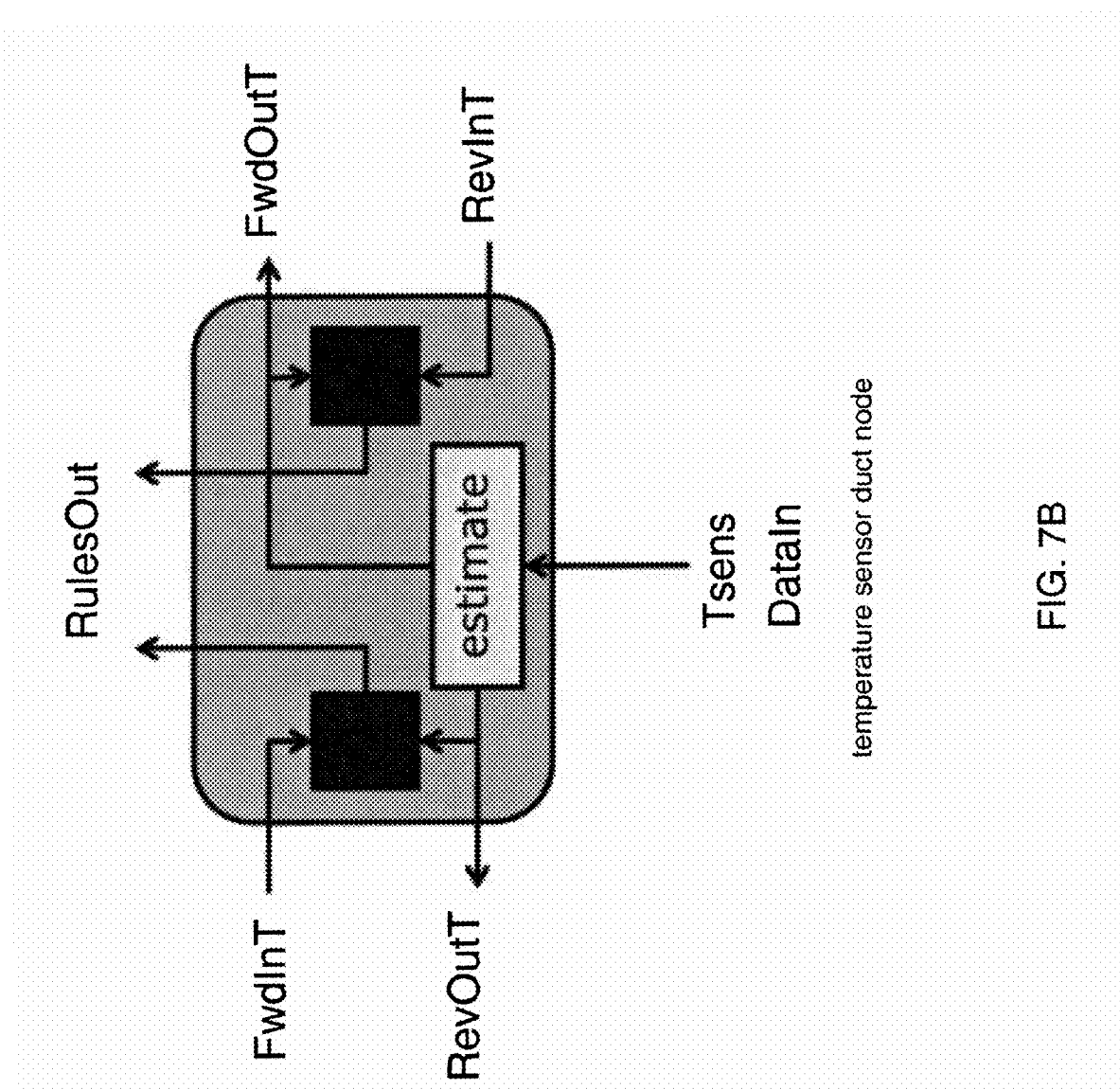
FIG. 7B is an exemplary HFM temperature sensor duct node.

FIG. 7B shows a temperature sensor duct node that includes DataIn edge Tsens. The Tsens temperature tolerance range is $$T\text{sensMax}=T\text{sens}+\text{tolerance, and} \qquad (18)$$

$$T\text{sensMin}=T\text{sens}-\text{tolerance.} \qquad (19)$$

Rule1 (16) and rule2 (17) compare the Tsens tolerance range TsensMin,TsensMax with $A_j$ and $B_j$ vector temperature ranges Tmin,Tmax.

Figure 7C:
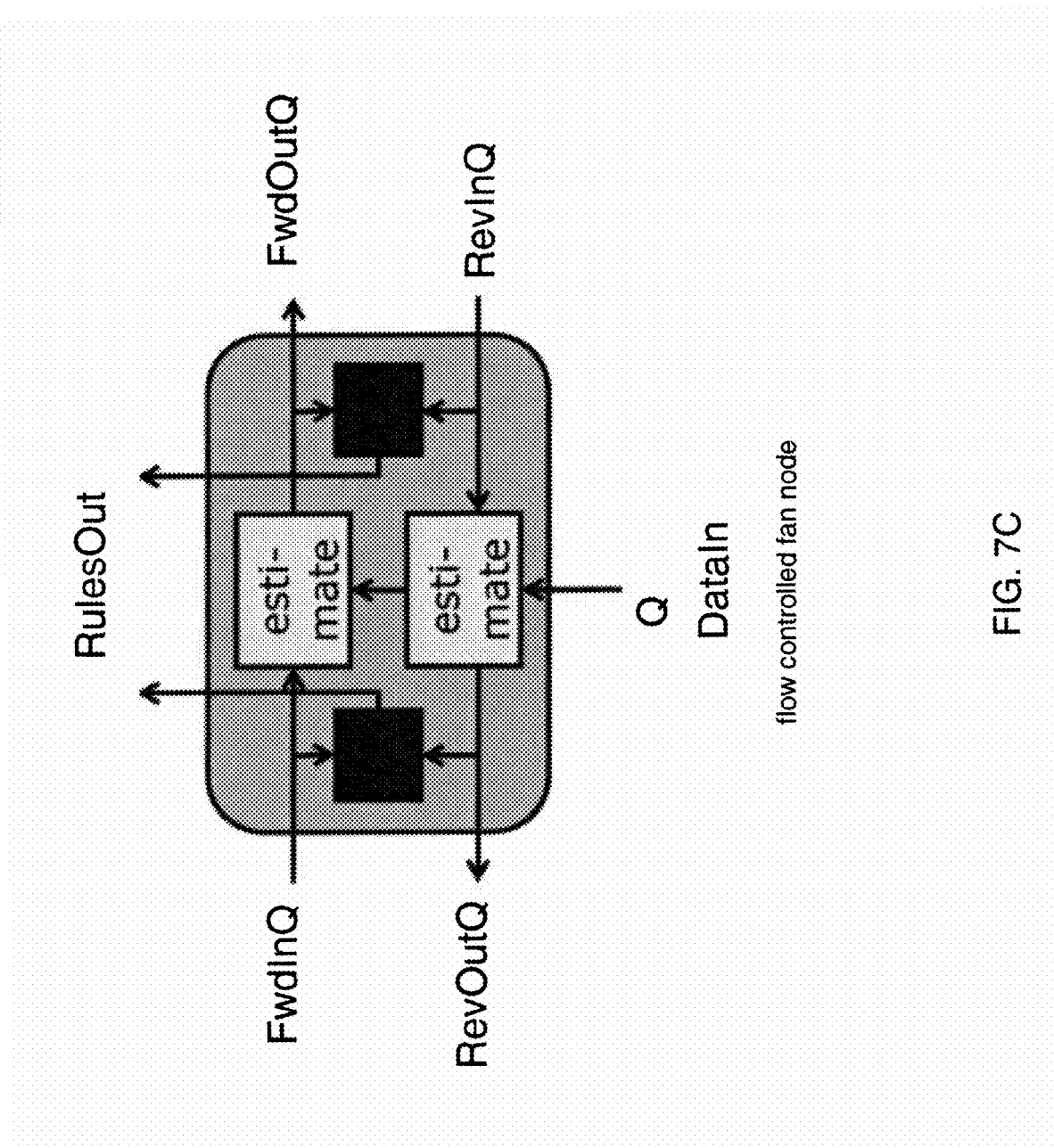
FIG. 7C is an exemplary HFM flow controlled fan node.

FIG. 7C shows a flow controlled fan node that includes DataIn edge Q (flow sensor measurement). A fan node is an estimation function. The air temperature typically increases in the order of 1° C. from FwdIn to FwdOut due to heat load. Since the increase includes a tolerance, the FwdOut $A_{j+1}$ temperature range Tmin,Tmax expands and is wider than the FwdIn $A_j$ temperature range Tmin,Tmax. In the upstream direction, the temperature range Tmin,Tmax decreases from RevIn $B_j$ to RevOut $B_{j+1}$ by the same amount.

Figure 7D:
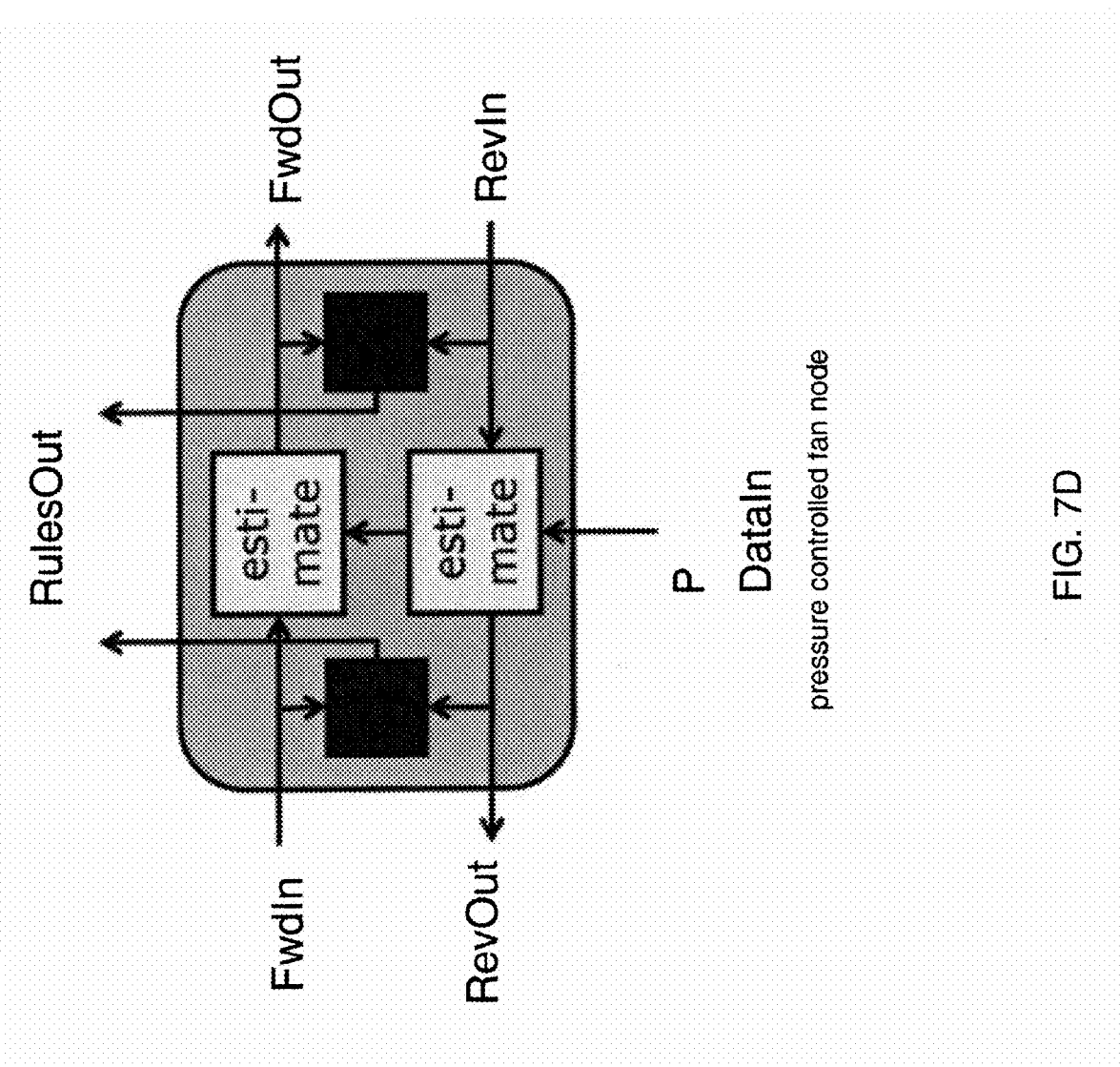
FIG. 7D is an exemplary HFM pressure controlled fan node.

If the fan is a constant flow rate type, it can propagate the flow rate downstream and upstream. FIG. 7D shows a pressure controlled fan node that includes DataIn edge P (pressure sensor measurement). For fans of a constant pressure type, the pressure can be propagated downstream, but not upstream. Pressure controlled fans vary air flow rate. Therefore, the air temperature increase (FwdOut $A_{j+1}$ temperature range Tmin, Tmax) changes as a function of rate. Modern fans reduce electric power proportional to the air flow rate and thus keep the temperature increase constant.

The flow controlled fan node (FIG. 7C) propagated temperature ranges:

$$FwdOutT\text{max}=FwdInT\text{max}+dTf\text{max}, \quad (20)$$

where dTfmax=maximum fan heat load, $$RevOutT\text{Max}=RevInT\text{Max}-dTf\text{min}, \quad (21)$$

where dTfmin=minimum fan heat load, $$FwdOutT\text{min}=FwdInT\text{min}+dTf\text{min}, \text{ and} \quad (22)$$

$$RevOutT\text{min}=RevInT\text{min}-dTf\text{max}. \quad (23)$$

Propagated Flow Ranges:

$$FwdOutQ\text{max}=Q\text{max}, \quad (24)$$

$$RevOutQ\text{max}=Q\text{max}, \quad (25)$$

$$FwdOutQ\text{min}=Q\text{min}, \text{ and} \quad (26)$$

$$RevOutQ\text{min}=Q\text{min}. \quad (27)$$

Rule1 (16) and rule2 (17) compare estimated temperature and flow with propagated values. The pressure controlled fan node (FIG. 7D) propagated temperature range:

$$FwdOutT\text{max}=FwdInT\text{max}+dTf\text{max}, \quad (28)$$

where dTfmax=maximum fan heat load, $$RevOutT\text{max}=RevInT\text{max}-dTf\text{min}, \quad (29)$$

where dTfmin=minimum fan heat load, $$FwdOutT\text{min}=FwdInT\text{min}+dTf\text{min}, \text{ and} \quad (30)$$

$$RevOutT\text{min}=RevInT\text{min}-dTf\text{max}. \quad (31)$$

Propagated Pressure Range:

$$FwdOutP\text{max}=P\text{max}, \quad (32)$$

$$RevOutP\text{max}=P\text{max}, \quad (33)$$

$$FwdOutP\text{min}=P\text{min}, \text{ and} \quad (34)$$

$$RevOutP\text{min}=P\text{min}. \quad (35)$$

Figure 7E:
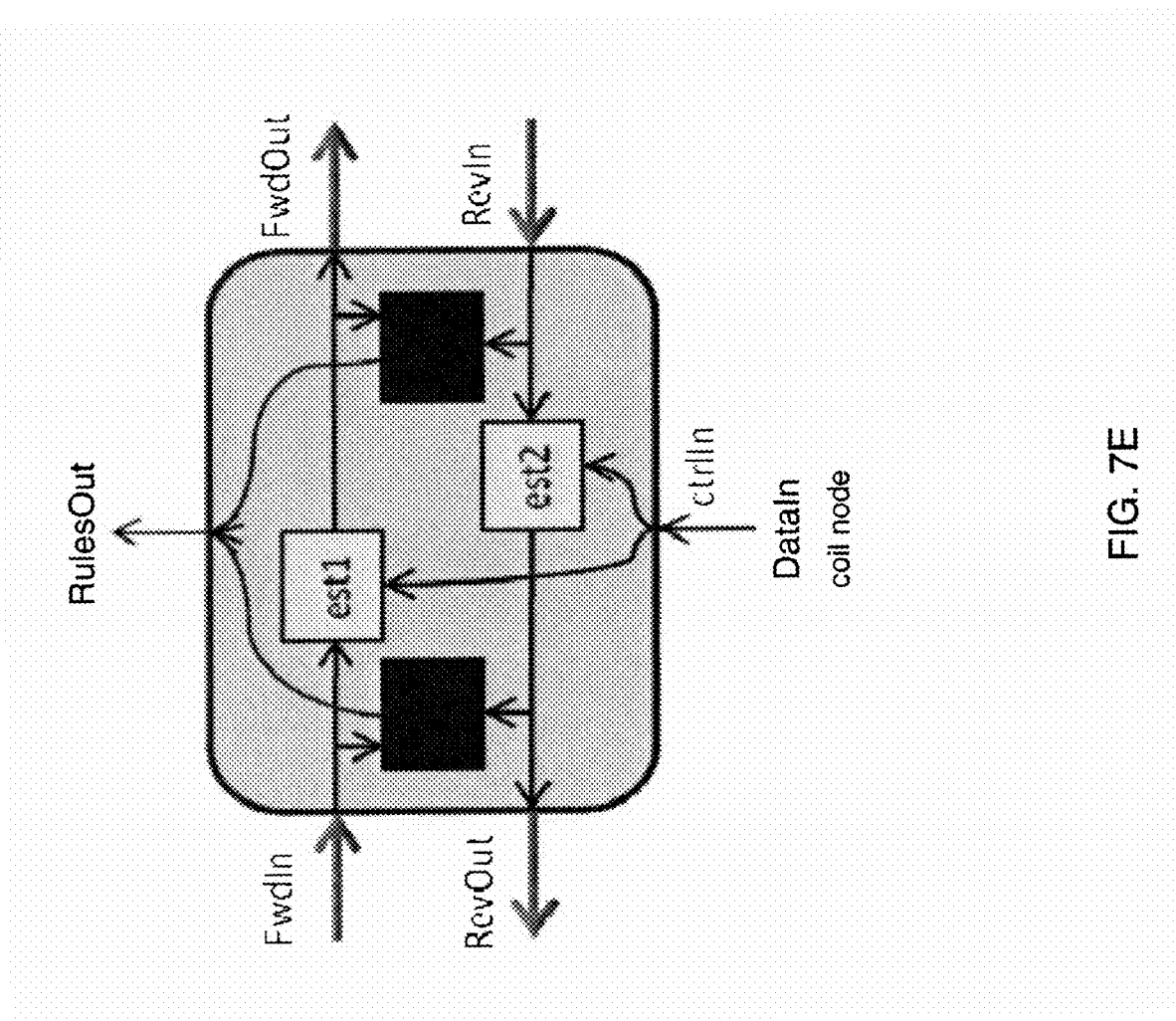
FIG. 7E is an exemplary HFM coil node.

FIG. 7E shows a coil node that includes DataIn edge ctrlIn. Coil nodes for heating or cooling have complex physical models. The number of unknown parameters and state variables is large. Therefore, it is necessary to create several typical coil node types in the library or one type with different selectable estimators.

Figure 7F:
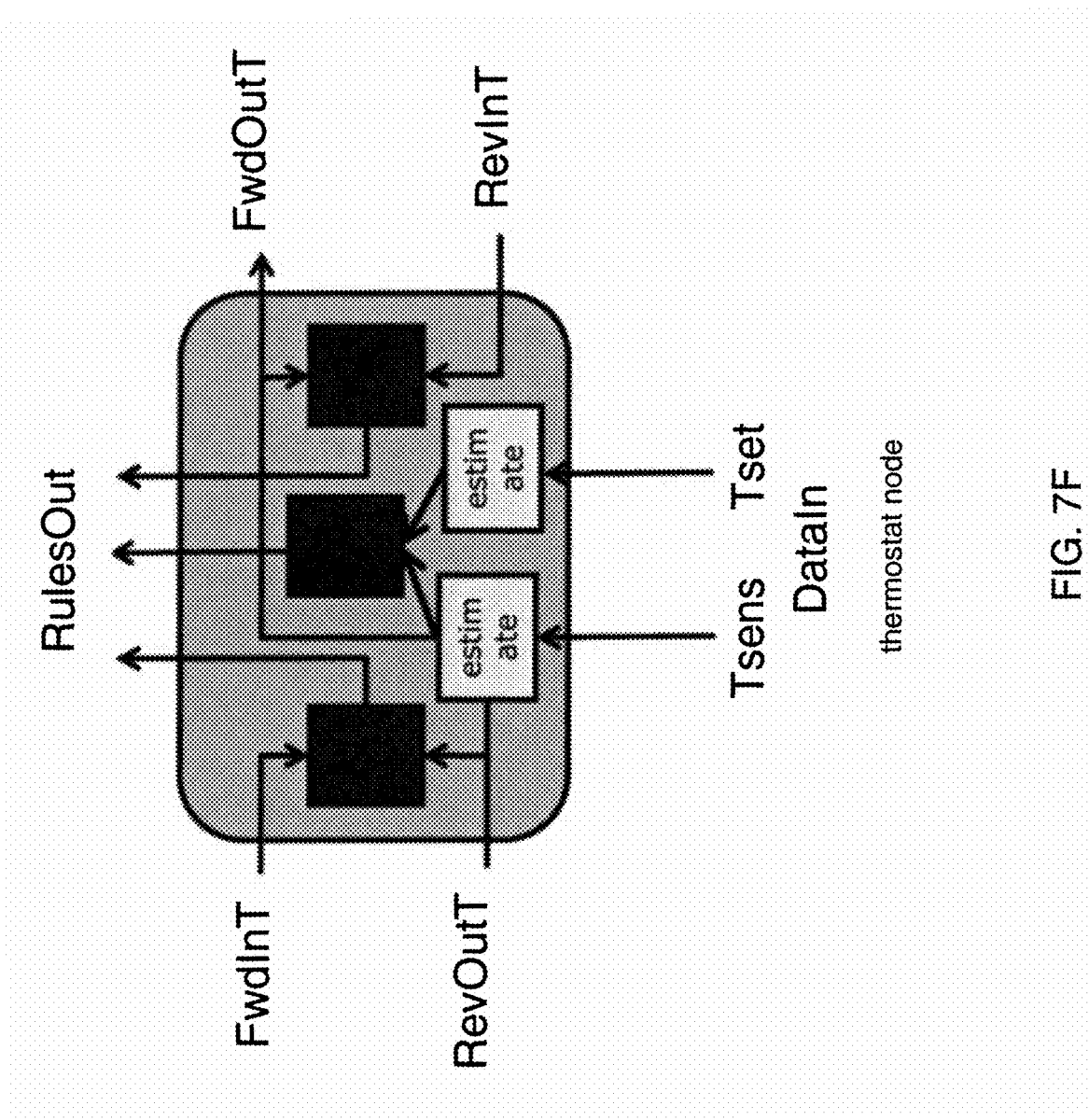
FIG. 7F is an exemplary HFM thermostat node.

FIG. 7F shows a thermostat node that includes DataIn edges Tsens and TSet. TSet is the thermostat setpoint and Tsens is the temperature measurement process variable. The propagated temperature range is $$FwdOutT\text{max}=T\text{sens}+\text{tolerance}, \text{ and} \quad (36)$$

$$FwdOutT\text{min}=T\text{sens}-\text{tolerance}. \quad (37)$$

Rule1 (16) and rule2 (17) compare a node temperature tolerance range with a propagated (FwdIn, RevIn) temperature range. Rule3 (14) compares a setpoint Tset estimate with an estimated temperature measurement.

Figure 7G:
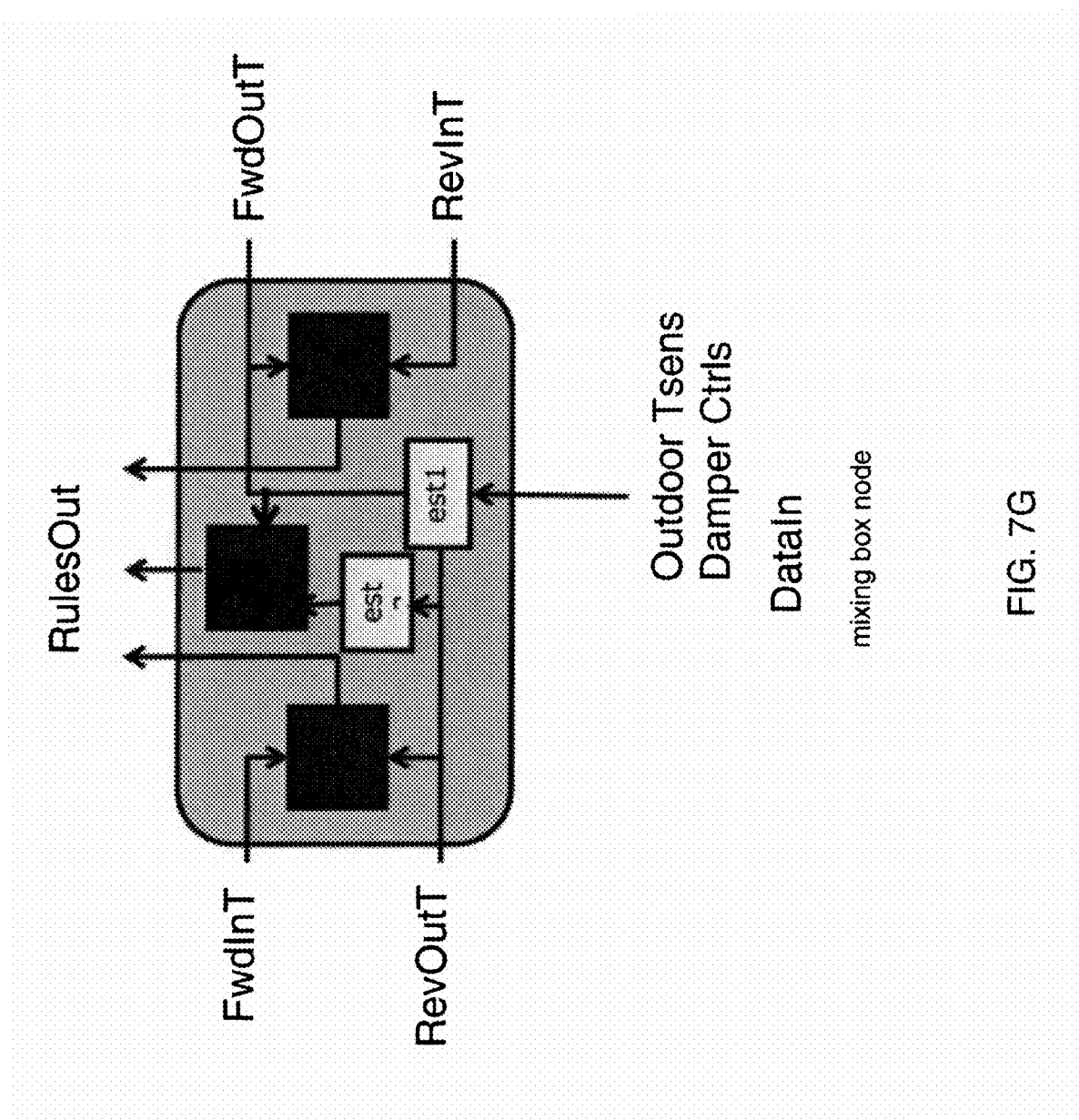
FIG. 7G is an exemplary HFM mixing box node.

FIG. 7G shows a mixer box node that includes DataIn edge Toutdoor Tsens/Damper Ctrls. A physical mixing box includes a temperature sensor Toa for measuring outdoor air and changes supply air temperature measured by another temperature sensor Tma by mixing outdoor air with return air measured by another temperature sensor Tra. The mixing ratio is controlled by three modulating dampers (FIG. 2). The supply flow rate equals the return flow rate if no outside air is admitted. But it cannot be assumed that the mixing rate is proportional to the damper control signal from an AHU controller. There are two extremes when the outdoor air damper is either fully closed or fully open that the mixing rate is precisely known. The largest deviation due to nonlinearity can be assumed at 50% open. This relation is considered in the mixing function when estimating the mixed air temperature and humidity.

The propagated temperature range is $$FwdOutT\text{max}=T\text{sens}+\text{tolerance}, \text{ and} \quad (38)$$

$$FwdOutT\text{min}=T\text{sens}-\text{tolerance}. \quad (39)$$

Est2 estimation for temperature range T for Tma using damper opening percentage and Toa estimation.

Rule1 (16) and rule2 (17) are comparisons of the temperature tolerance range with propagated temperature range. Rule3 (14) is a comparison of estimated Tma using the damper openings and thermal dynamics to estimated measurement of Tma.

Figure 7H:
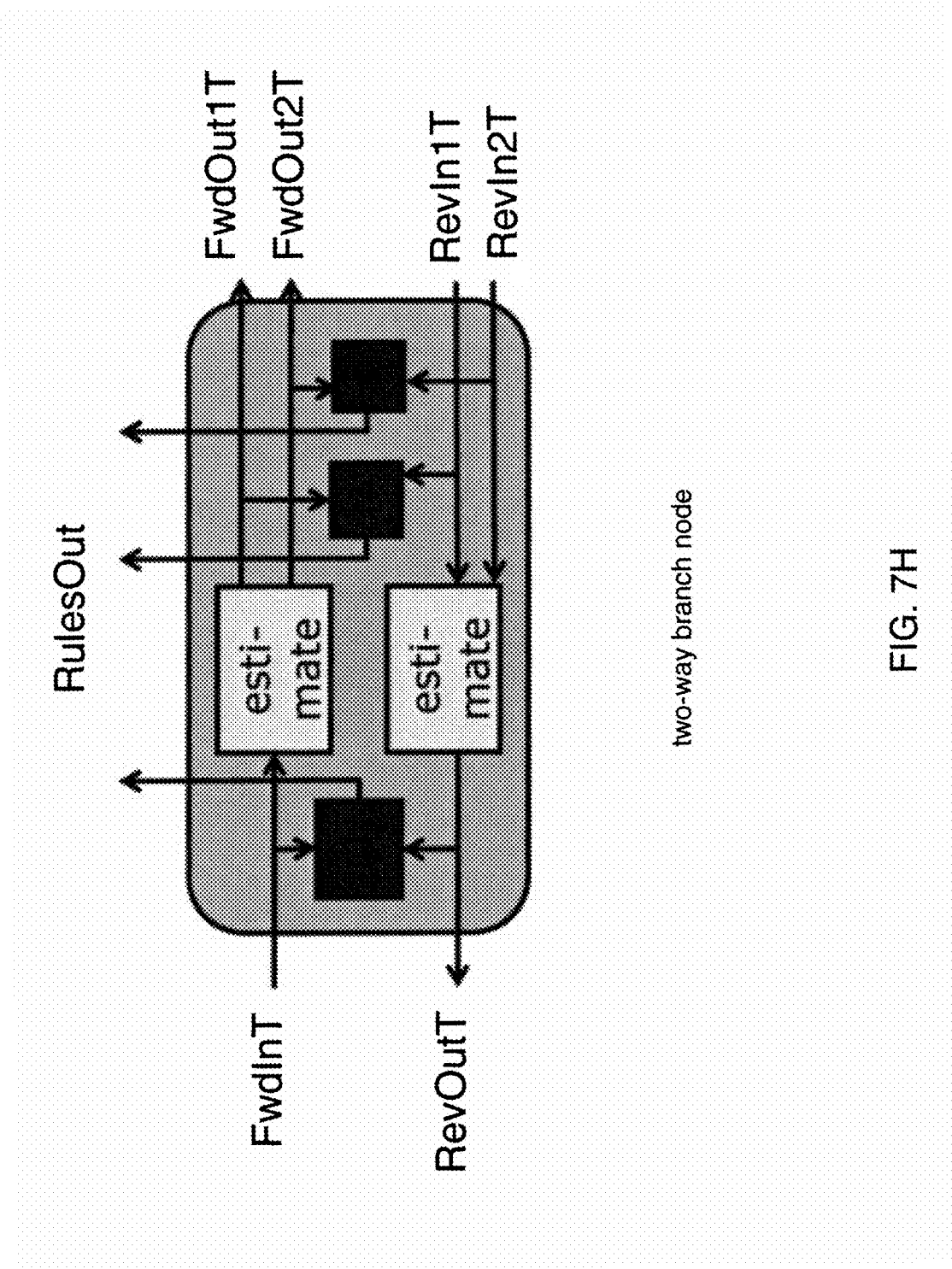
FIG. 7H is an exemplary HFM two-way branch node.

FIG. 7H shows a two-way branch node. A duct branch propagates air temperature, flow, pressure and humidity, and allows reverse calculation of air flow rate. Air flow rate is measured in all VAVs. The sum of all measured values is the air flow rate in the input of the branch as a RevOut value.

Estimation for Temperature and Flow Range:

$$FwdOut1T\text{max}=FwdInT\text{max}+dTf\text{max}, \quad (40)$$

where dTfmax=change through branch, $$RevOutT\text{max}=\text{Max}(RevIn1T\text{max}-dTf\text{min}, RevIn2T\text{max}-dTf\text{min}), \quad (41)$$

where dTfmin=change through branch, $$FwdOut1T\text{min}=FwdInT\text{min}+dTf\text{min}, \quad (42)$$

$$RevOutT\text{min}=\text{Min}(RevIn1T\text{min}-dTf\text{max}, RevIn2T\text{min}-dTf\text{min}-dTf\text{max}), \quad (43)$$

$$FwdOut2T\text{max}=FwdInT\text{max}+dTf\text{max}, \text{ and} \quad (44)$$

$$FwdOut2T\text{min}=FwdInT\text{min}+dTf\text{min}. \quad (45)$$

Rule1 (16), rule2 (17) and rule3 (14) compare temperature tolerance range with propagated temperature range.

Figure 7I:
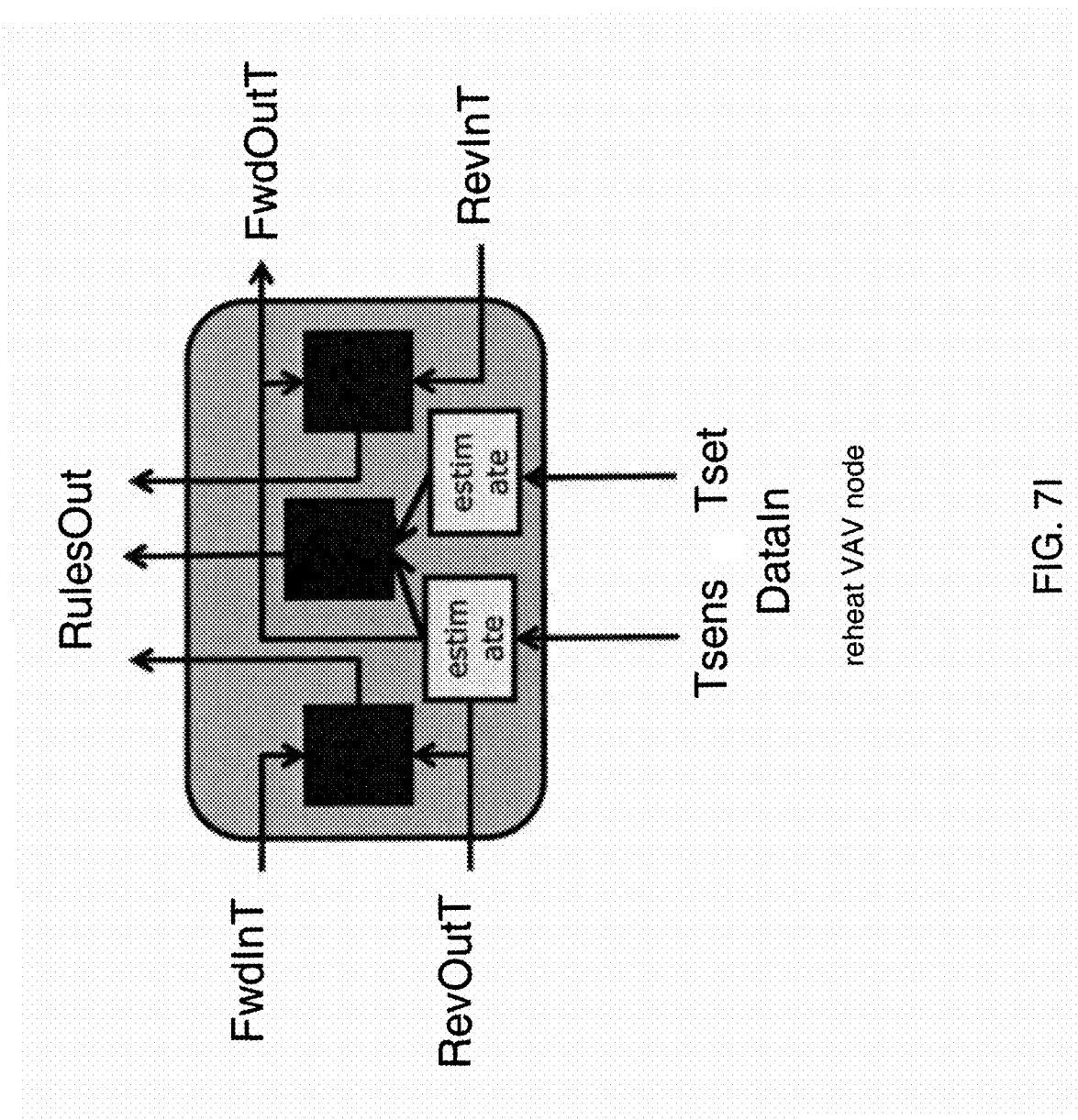
FIG. 7I is an exemplary HFM reheat Variable Air Volume (VAV) node.

FIG. 7I shows a reheat VAV node that includes DataIn edges Xsens and XSet. XSet is a controller setpoint and Xsens is a sensor variable. A reheat VAV is a complex node. If equipped with sensors for air flow rate and distribution temperature, an air flow rate can be estimated using the FwdIn edge propagated pressure range and the damper control value. Using the input air temperature, the measured flow and for example, the electric power value of the reheat coil, the distribution temperature can be estimated. Both estimations can be evaluated with the sensor values in failure rules using (16) and (17). In addition, if a setpoint is defined, the compliance can be evaluated as well.

Estimation for temperature range is $$FwdOutTmax = Tsens + tolerance, \text{ and} \quad (46)$$

$$FwdOutTmin = Tsens - tolerance. \quad (47)$$

Rule1 (16) and rule2 (17) compare estimated temperature ranges with propagated temperature ranges. Rule3 (14) compares estimated setpoint Tset with estimated measurement Tsens.

Space that is serviced with heating or cooling from one VAV and has a temperature sensor to control the VAV can propagate ranges downstream and upstream. As a minimum, it can evaluate if the air temperature is at setpoint. If the heat load and loss in the space is known, especially in closed rooms, estimations of the necessary heating or cooling power can be compared with the distributed air parameters of the VAV as a failure rule. This may require the outdoor temperature as a data input.

The return air from spaces is collected in a joint duct. Failure rules may be applied if the temperature of the joined air can be estimated. The air temperature in each space is known with tolerances at the location of the sensor for the control of the VAVs. At the air intakes the air temperature will be different, adding to the tolerance. If the air flow rate of the return air of each space would be known, temperature ranges for the joined air can be calculated. In open plan offices individual flow rates are not known. The upper limit of the range can not be higher than the largest measured sensor value, with the lower limit not less than the smallest. The FwdOut edge temperature range can be used to detect for example a large fault of the return air sensor.

HFM graphs specify the physical structures and fault detection functions. Embodiments specify a hierarchical structure of autonomous communicating processes that can be interpreted as agents. The HFM nodes can be directly mapped into, for example, Specification and Description Language (SDL) processes. The advantage of SDL models is that a model can be automatically translated into C code and compiled into executable prototype systems. SDL prototype experiments show that the introduced faults lead to positive failure rule outputs that are collected in files.

Figure 8:
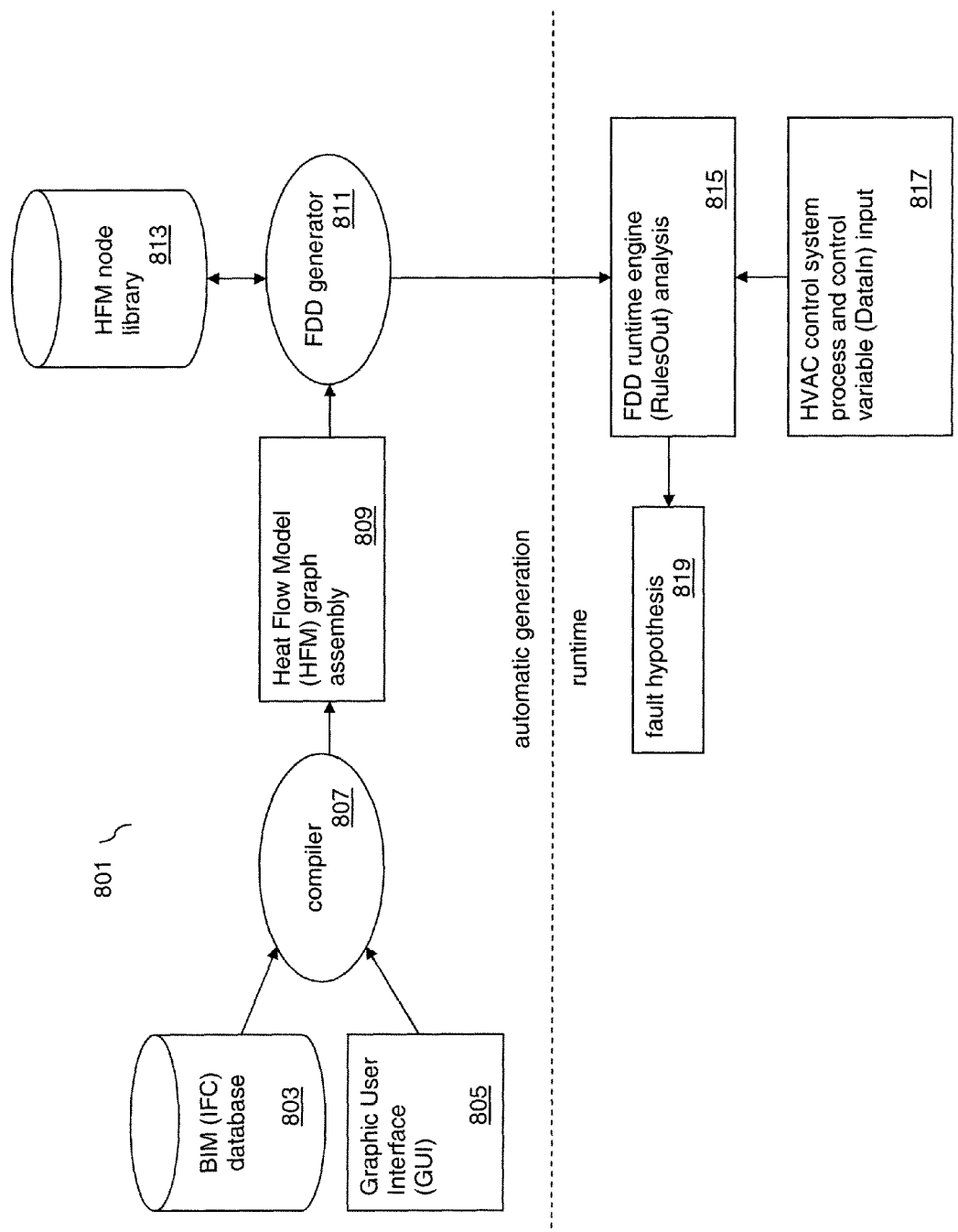
FIG. 8 is an exemplary FDD system using HFM nodal analysis.

Embodiments comprise an engineering phase and a runtime phase. FIG. 8 shows an HFM building FDD system 801. The HFM building FDD system 801 comprises an interface 803 configured to access and import BIM/IFC files, a Graphic User Interface (GUI) 805 configured to allow additional data to be input during graph assembly and view linkage information among different components and enter and configure missing parameters, conditions, and switches not found in the BIM, and a compiler 807 to compose together the file data with the additional engineering information.

The benefit of HFM is the engineering efficiency it brings to HFM based FDD systems. Due to the modularity of HFM, it can be automatically composed from the BIM and graph models can be effectively compiled into executable FDD systems. IFC may be used to derive an HFM model since IFC is one of the most commonly used BIM formats.

IFC provides a set of definitions for all object element types encountered in HVAC mechanical and control system and a text-based structure for storing those definitions in a data file. It comprises two major parts: IfcElement and IfcPort. An element can be any component that can be connected to neighboring elements, using one or many ports. The IFC elements include flow segments (duct), flow fittings (duct joint), moving devices (fans), flow controllers, etc. Every HFM node can be mapped from IFC elements.

The IFC element objects have defined the basic properties and attributes which are used for HFM node graphs. FIG. 9 shows a list mapping relationship between IFC HVAC elements and HFM node types. The inheritance of an HVAC node type is realized through the associated IFC type definition of each element. There are no direct mappings for node types such as Mixer, Reheat VAV and they are composites of basic IFC elements.

The connectivity model for HFM can be derived through IfcPort. A port is a point in the network at which elements are connected to each other. An IfcPort is associated with an IfcElement, it belongs to, through the objectified relationship IfcRelConnectsPortToElement. Therefore, the linkage information for HFM can be obtained through searching IFC model for the IFC element objects, IFC port objects, and IfcRelConnectsPortToElement objects. FIG. 9 shows the correspondence between IFC types and HFM nodes.

HFM reduces the engineering effort required to configure FDD systems for different HVAC systems. HFM is the bridge between the BIM and the compiled graph model based executable FDD systems.

The compiler 807 is coupled to an HFM engine 809 that is configured to generated an HFM model in an eXtensible Markup Language (XML) format, the HFM model is input to an FDD generator 811 configured to populate the identified HFM node types with functional HFM graph nodes from an HFM node library 813.

The HFM graph derived offline can be loaded into a runtime FDD system to instantiate an FDD engine 815 for the specific building HVAC control system and configured to execute the resultant HFM graph inputting HVAC control system process and control variables from an input interface 817. During runtime, the real-time HVAC control system data is input to an FDD engine 819 configured to analyze the rules employed in the HFM graph.

HFM makes fault detection for HVAC system realistic. To save the engineering effort for configuring HFM based FDD for each specific building, object orientation is used for modeling and also for implementation. Objects in the model represent real components with functions to capture the correct behavior and rules for detecting faults. Object models are provided in a node library and are assembled as graphs by signal path as real components are connected by ducts and pipes. Objects can be hierarchically composed and decomposed.

HFM can have many different node types. Using inheritance, more node types does not mean more effort to extend the library.

Whether the FDD is centrally hosted by a building management system or distributed in digital process controllers, it receives runtime control signals and sensor data from the respective HVAC control system. For each HFM node, based on received measurements and flow information from upstream and downstream nodes, HFM makes state estimation, propagates resulting vector parameter ranges to adjacent nodes, and detects faults accordingly. The faults are also propagated up in the component hierarchy and a diagnosis is made.

During the engineering phase, the GUI 805 is used to edit HFM nodes and graphs from BIMs. It first identifies all the HVAC node objects from IFC and retrieves the useful attributes to create node estimation models. It also creates the connectivity among different nodes from IFC connectivity data. For those missing parameters, conditions, and switches not found in the BIM, the tool provides an interface for the user to enter data. Otherwise, default settings are used.

This information is compiled 807 together and an HFM model is generated in XML format. The XML based HFM graph is loaded into an HVAC FDD system, which compiles the graph model into an FDD engine 815 based on its runtime compiling capability and an existing object library for HFM nodes. The FDD engine 815 can be embedded in the existing Building Management System (BMS) to perform fault detection and diagnosis using the rules modeled in each node and the propagation of faults.

The FDD engine 815 may be implemented using Specification Description Language (SDL) modeling tools. SDL specifies a hierarchical structure of autonomous communicating processes that can be interpreted as agents. Flow nodes can be directly mapped into SDL processes. The advantage of SDL models is that a model can be automatically translated into C-code and compiled into executable prototype systems.

One or more embodiments of the present invention have been described. Nevertheless, it will be understood that various modifications may be made without departing from the spirit and scope of the invention. Accordingly, other embodiments are within the scope of the following claims.

What is claimed is:

1. A method of using a Heat Flow Model (HFM) graph for detecting HVAC system faults for a building comprising:
    translating formal HVAC system descriptions from a Building Information Model (BIM) for the building as HFM nodes;
    retrieving HVAC component attributes from the BIM for each HFM node;
    retrieving predefined HFM nodes from an HFM node library that correspond to the BIM for each HVAC equipment type respectively;
    creating connectivity among the retrieved HFM nodes from BIM connectivity data;
    compiling the HFM nodes into an HFM graph;
    inputting real-time data from the building HVAC control system to the HFM graph for fault detection;
    detecting building HVAC system faults using node rules which are conditioned inequalities based on node specific configuration data that defines the functionality of a physical HVAC component; and
    mapping rule violations from the HFM nodes to the building HVAC control system failures.

2. The method according to claim 1 further comprising generating the HFM graph in an eXtensible Markup Language (XML) format.

3. The method according to claim 1 further comprising editing the HFM graph for missing parameters, conditions and switches not found in the BIM.

4. The method according to claim 1 wherein the BIM is an Industrial Foundation Class (IFC).

5. The method according to claim 1 wherein the HFM graph is a one-to-one correspondence with a component structure of the physical building HVAC system and the HFM graph nodes model the dynamic physical behavior of temperature, humidity, flow rate and pressure parameters of the physical building HVAC components as derived from the BIM.

6. The method according to claim 1 wherein each HFM graph node estimates upstream and downstream physical behavior values that correspond to their building HVAC components with dynamic output instrument sensor and control data from the building HVAC control system and propagates the upstream and downstream physical behavior values through the HFM graph as estimated parameter ranges.

7. A building Heating, Ventilation and Air Conditioning (HVAC) fault detection system comprising:
    an interface configured to access a Building Information Model (BIM) file library and import the building HVAC system BIM files;
    an HFM node library configured to store a plurality of different predefined HFM node types wherein an HFM node models the dynamic physical behavior parameters of air and water flows in predefined HVAC components as derived from the BIM files;
    a Graphic User Interface (GUI) configured to input and edit HFM node and linkage configuration data during an HFM graph assembly;
    a compiler coupled to the interface and GUI, configured to compose together the BIM file data with the additional linkage configuration data; and
    a Fault Detection and Diagnosis (FDD) generator coupled to the compiler and HFM node library, configured to compare the BIM file types for the building HVAC system with the predefined HFM node types and select from the predefined HFM node types, the HFM nodes that correspond and generate an HFM graph wherein the HFM graph is by mass air flow path corresponding to the building HVAC system components and behavior.

8. The system according to claim 7 further comprising:
    an FDD engine configured to instantiate the HFM graph as a runtime system for the building HVAC control system; and
    an interface configured to access the building HVAC control system, wherein the FDD engine executes the HFM graph with HVAC control system process and control variable data and applies rules for detecting HVAC system faults.

9. The system according to claim 7 wherein the dynamic physical behavior parameters are temperature, humidity, flow and pressure.

10. The system according to claim 8 wherein an HFM node estimates upstream and downstream physical behavior parameters of connected HVAC components with the dynamic output data from the HVAC control system using instrument process and control variables and propagates the results through the HFM graph as parameter ranges.

11. The system according to claim 7 wherein the BIM files further comprise Industrial Foundation Class (IFC) files.

12. The system according to claim 11 wherein the IFC files provide a set of definitions for IFC object element types encountered in an HVAC mechanical and control system, and a text-based structure for storing the object element type definitions in a data file wherein the IFC object elements define basic properties and attributes used in the HFM node graph.

13. The system according to claim 12 wherein an IFC object element comprises two parts, an IFC element and an IFC port, wherein an element is a component that can be coupled to an adjacent element using one or more ports, and the IFC elements include flow segments, flow fittings, moving devices and flow controllers.

14. The system according to claim 13 wherein the compiler is further configured to identify all the HFM nodes from the IFC elements and retrieve attributes to create node estimation models and create the connectivity among different nodes from IFC connectivity data.

15. The system according to claim 7 wherein the FDD generator generates an HFM model in XML format.

16. The system according to claim 7 wherein the HFM node library contains HFM node object models that can be hierarchically composed and decomposed.

17. The system according to claim 8 wherein for each HFM node, based on received measurements and flow information from upstream and downstream HFM nodes, the FDD engine is further configured to perform state estimation and propagate resulting parameter ranges to adjacent nodes.

18. A non-transitory computer readable medium having recorded thereon a computer program comprising code means for, when executed on a computer, instructing the computer to generate a Heat Flow Model (HFM) node used in a Heating, Ventilation and Air Conditioning (HVAC) HFM fault detection graph that models the dynamic physical behavior parameters of temperature T, humidity H, flow rate Q and pressure P of a physical HVAC component comprising:

a FwdIn edge configured to receive parameter ranges $A_j$ that represent physical data upstream of the node;

a RevIn edge configured to receive parameter ranges $B_j$ that represent physical data downstream of the node;

one or more DataIn edges, each DataIn edge configured to receive dynamic HVAC control system data wherein the control system data is used with node specific configuration data that defines the functionality of the physical HVAC component to calculate a node rule tolerance, downstream estimate parameter ranges $A_{j+1}$ and upstream estimate parameter ranges $B_{j+1}$;

a FwdOut edge configured to output the downstream estimate parameter ranges $A_{j+1}$ that represent the affect that the physical HVAC component has on the received parameter ranges $A_j$;

a RevOut edge configured to output the upstream estimate parameter ranges $B_{j+1}$ that represent the affect that the physical HVAC component has on the received parameter ranges $B_j$; and two or more RulesOut edges, each RulesOut edge configured to output a failure rule decision from a conditioned inequality wherein a first failure rule compares a downstream estimated parameter range $A_{j+1}$ maximum with a like FwdIn edge parameter range $A_j$ minimum and a second failure rule compares an upstream estimated parameter range $B_{j+1}$ maximum with a like RevIn edge parameter range $B_j$ minimum and if the first or second rule is true, a fault exists in the physical HVAC component.

19. The non-transitory computer readable medium according to claim 18 wherein the FwdIn edge parameter ranges $A_j$ are propagated from an adjacent upstream HFM node and the RevOut edge estimated parameter ranges $B_{j+1}$ are propagated to the adjacent upstream HFM node, and the FwdOut edge estimated parameter ranges $A_{j+1}$ are propagated to an adjacent downstream HFM node and the RevIn edge parameter ranges $B_j$ are propagated from the adjacent downstream HFM node.

20. The non-transitory computer readable medium according to claim 18 wherein the FwdIn edge parameter ranges $A_j$, the FwdOut estimated parameter ranges $A_{j+1}$, the RevIn edge parameter ranges $B_j$ and the RevOut edge estimated parameter ranges $B_{j+1}$ are vectors expressed as a minimum and a maximum of an estimated parameter range, the estimated temperature parameter range defined by Tmin, Tmax values, the estimated flow parameter range defined by Qmin, Qmax values, the estimated humidity parameter range defined by Hmin, Hmax values and the estimated pressure parameter range defined by pmin, pmax values.

* * * * *